(12) United States Patent
Wichern et al.

(10) Patent No.: US 11,978,476 B2
(45) Date of Patent: May 7, 2024

(54) METHOD AND SYSTEM FOR DETECTING ANOMALOUS SOUND

(71) Applicant: Mitsubishi Electric Research Laboratories, Inc.

(72) Inventors: Gordon Wichern, Cambridge, MA (US); Ankush Chakrabarty, Cambridge, MA (US); Zhong-Qiu Wang, Cambridge, MA (US); Jonathan Le Roux, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 382 days.

(21) Appl. No.: 17/478,916

(22) Filed: Sep. 19, 2021

(65) Prior Publication Data
US 2023/0086355 A1 Mar. 23, 2023

(51) Int. Cl.
*G10L 25/78* (2013.01)
*G06N 3/08* (2023.01)
*G10L 21/12* (2013.01)
*G10L 21/14* (2013.01)
*G10L 25/30* (2013.01)

(52) U.S. Cl.
CPC ............... *G10L 25/78* (2013.01); *G06N 3/08* (2013.01); *G10L 21/12* (2013.01); *G10L 21/14* (2013.01); *G10L 25/30* (2013.01)

(58) Field of Classification Search
CPC ......... G10L 25/78; G10L 21/12; G10L 21/14; G10L 25/30; G06N 3/08
See application file for complete search history.

(56) References Cited

U.S. PATENT DOCUMENTS 9,368,110 B1 * 6/2016 Hershey ................. G06N 3/047

OTHER PUBLICATIONS

Müller, Robert, Steffen Illium, and Claudia Linnhoff-Popien. "Deep recurrent interpolation networks for anomalous sound detection." 2021 International Joint Conference on Neural Networks (IJCNN). IEEE, 2021. (Year: 2021).*
Doshi Ketan, Audio Deep Learning Mode Simple: Sound classification, step by step. Towards Data Science. Mar. 18, 2021.

* cited by examiner

*Primary Examiner* — Douglas Godbold
*Assistant Examiner* — Edward Tracy, Jr.
(74) *Attorney, Agent, or Firm* — Gene Vinokur; Hironori Tsukamoto

(57) ABSTRACT

A system and method for detecting anomalous sound are disclosed. The method includes receiving a spectrogram of an audio signal with elements defined by values in a time-frequency domain of the spectrogram. Each of the values corresponds to an element of the spectrogram that is identified by a coordinate in the time-frequency domain. The time-frequency domain of the spectrogram is partitioned into a context region and a target region. The context region and the target region are processed by a neural network using an attentive neural process to recover values of the spectrogram for elements with coordinates in the target region. The recovered values of the elements of the target region are compared with values of elements of the partitioned target region. An anomaly score is determined based on the comparison. The anomaly score is used for performing a control action.

20 Claims, 17 Drawing Sheets

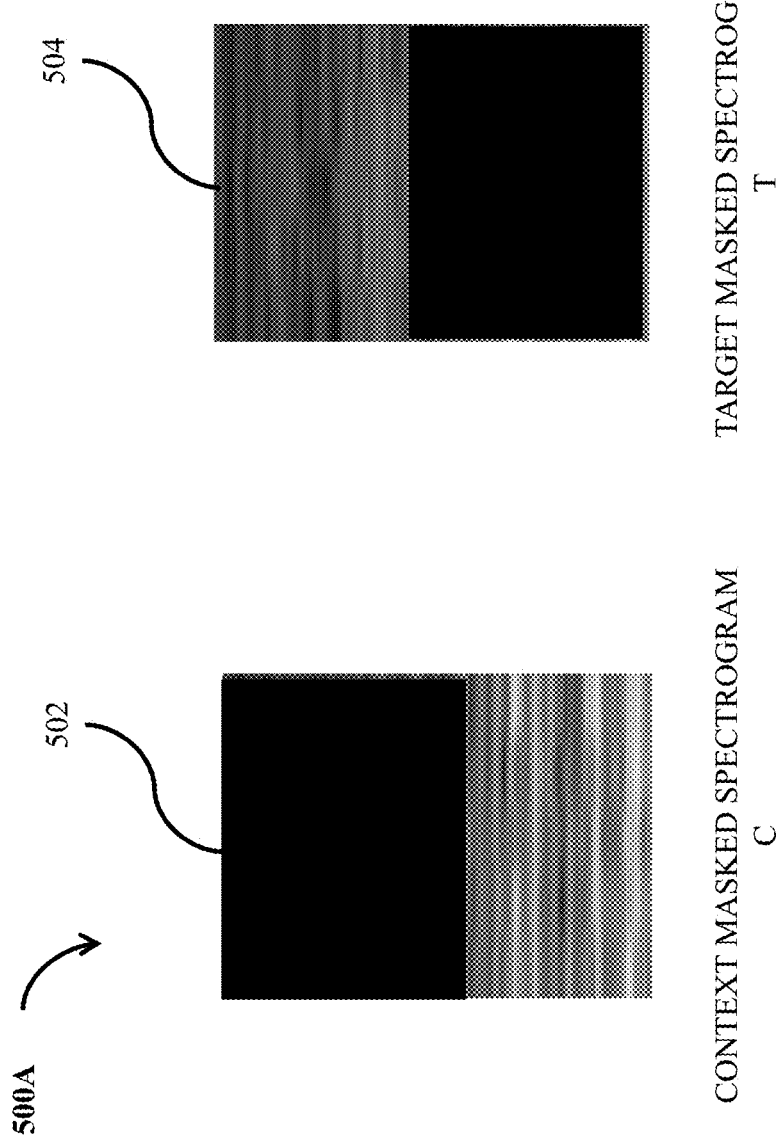

METHOD AND SYSTEM FOR DETECTING ANOMALOUS SOUND

TECHNICAL FIELD

The present disclosure generally relates to anomaly detection and more particularly to method and system for detecting anomalous sound.

BACKGROUND

Diagnosis and monitoring of machine operating performance is important for a wide variety of applications. The diagnosis and the monitoring operations may often be performed manually by a skilled technician. For instance, the skilled technician may listen and analyze sounds produced by the machine to determine an anomalous sound. The manual process to analyze the sounds may be automated to process sound signals produced by the machine and to detect anomalous sound in the sound signals. Such automated sound diagnosis may be trained to detect the anomalous sound based on deep learning-based techniques. Typically, the automated sound diagnosis may be trained to detect anomalous sound using training data that correspond to normal operating conditions of the sound diagnosis. The anomalous sound detection based on such training data is an unsupervised approach. The unsupervised anomalous sound detection may be suitable for detecting specific types of anomalies, such as abrupt transient disturbances or impulsive sound that may be detected based on abrupt temporal changes.

However, the abrupt temporal changes may lack information of changes in frequency domain of the sound to detect the anomalous sound. The lack of changes in frequency for detecting the anomalous sound may result an inaccurate outcome, which is not desirable. In some cases, an entire audio signal of non-stationary sounds may be processed to detect anomalous sound in the audio signal. However, the audio signal may have fewer occurrences of the anomalous sound. Such lengthy processing of the audio signal with fewer occurrences of the anomalous sound may consume time and computing resources, which is infeasible. In some other cases, the fewer occurrences of the anomalous sound may not be detected due to the lengthy processing.

Accordingly, there is a need to overcome the above-mentioned problem. More specifically, there is need to develop a method and system for detecting anomalous sound in an audio signal in an efficient and feasible manner.

SUMMARY

Various embodiments of the present disclosure disclose a system and a method for detecting anomalous sound in an audio signal. It is the object of some embodiments to perform the anomalous sound detection using deep learning techniques.

Conventionally, anomalous sound in the audio signal may be detected based on auto-encoder or a variational auto-encoder. The auto-encoder may compress the audio signal and reconstruct the original audio signal from the compressed data. The variational auto-encoder may determine parameters of a probability distribution (e.g., a Gaussian distribution) in the audio signal to reconstruct the original audio signal. The reconstructed audio signal may be compared with the original audio signal to determine a reconstruction error for detecting the anomalous sound in the audio signal. More specifically, the audio signal may be represented into a spectrogram that includes a visual representation of signal strength or loudness of the audio signal over time at various frequencies.

In some embodiments, the spectrogram may be masked in certain regions of time and frequency domain of the audio signal. The masked regions may be pre-specified during the training of the neural network. The neural network processes the unmasked regions to generate a reconstructed spectrogram for the masked regions of the audio signal. The reconstructed representation is compared with the original spectrogram region to obtain a reconstruction error. The reconstruction error is a difference between the original spectrogram and the reconstructed spectrogram. The reconstruction error may be used to detect the anomalous sound.

Some embodiments of the disclosure are based on understanding that the auto-encoder may be trained for the anomalous sound detection based on training data that corresponds to non-anomalous sound data, such as normal sounds of normal operations of a machine. The auto-encoder that is trained using the non-anomalous data may model a data distribution of "normal" (non-anomalous) data samples. However, the reconstruction error may be high, as an anomalous sound may be detected by the auto-encoder that learns to reconstruct normal data. In some cases, the auto-encoder may be trained on specific predetermined region for a fixed and predetermined time and frequency locations to reconstruct a region of the audio signal. However, the auto-encoder may not be suitable for performing a dynamic search to determine regions distinguishable from the normal sounds. The distinguishable regions are regions that correspond to potentially anomalous sounds in the audio signal.

However, the auto-encoder that is trained based on normal sound data may not be capable to reconstruct anomalous sounds that are different from the normal sounds. During inference, some sounds may exhibit time-varying and highly non-stationary behavior. For instance, non-stationary sounds generated by a machine (e.g., a valve or a slider) may exhibit time-variance and non-stationary behavior. The time-variance and non-stationary sounds may be difficult for the auto-encoder to reconstruct the anomalous sounds. In such situation, the reconstruction error determined by the auto-encoder corresponding to the time-variance and non-stationary sounds may be inaccurate. The reconstruction error may be high even for normal operating conditions of the machines, which may be difficult to detect the anomalous sound.

Some embodiments of the disclosure are based on a realization that a portion of time signal from surrounding information in the audio signal may be processed. Such approach of processing the portion of time signal may preclude processing entire length of the audio signal to generate the reconstructed spectrogram. The processing of the portion of the audio signal may also improve performance for non-stationary sounds that include speech signals in and sound waves with varied frequency.

To that end, certain regions of the spectrogram of the audio signal may be masked based on the portion of time signal. The auto-encoder may process the masked regions of the spectrogram to generate the reconstructed spectrogram. The reconstructed spectrogram may be compared with the spectrogram to obtain a reconstruction error. The reconstruction error may be used over the masked regions of the spectrogram as an anomaly score. However, the auto-encoder may present frequency information of the audio signal, which may not be accurate to detect the anomalous sound. The auto-encoder may also fail to incorporate prior information about the time and/or frequency regions where the anomalous sound may occur in the spectrogram.

Some embodiments are based on the realization that the difficulties of anomaly detection of non-stationary audio signals may correspond to variability and versatility of time and frequency locations of anomalous regions of corresponding spectrograms. Specifically, reconstructing a region of non-stationary audio signal (e.g., speech, electrocardiogram (ECG) signal, machine sound, etc.) and testing the region for the anomaly may exclude that region from the volatility of the remaining regions of the audio signal and to focus the anomaly detection on a region of interest. However, the versatility of the non-stationary audio signal may result in the versatility of time and frequency locations that may include the anomalous sound. Hence, a specific region of the audio signal may be tested during the anomaly detection in an online mode, online anomalous sound detection. Additionally or alternatively, potentially anomalous region in the audio signal may be tested in the online anomalous sound detection.

To that end, some embodiments of the present disclosure disclose a neural network that uses an attentive neural process architecture for detecting an anomalous sound in non-stationary audio signals. The attentive neural process architecture is a meta-learning framework for estimating distributions over signals. Some embodiments are based on an understanding that the attentive neural process architecture may be used to recover a missing portion of an image. For instance, in a photo of a human face may not be fully captured when a finger accidentally obstructs a portion of a camera capturing the photo. The captured photo may include the human face that is partly covered by the obstructed portion, such as a forehead part of the human face is covered by the obstructed portion. The obstructed part of the human face may be recovered as the obstructed part is known. To that end, in some embodiments, the attentive neural process architecture may be adapted for searching and recovering different regions in the spectrogram of the audio signal. The different regions may include regions that may correspond to potentially anomalous sound in the spectrogram. In some embodiments, the regions of potentially anomalous sounds may be determined based on signal properties or prior knowledge, such as known anomalous behavior of sound. The use of signal properties or the prior knowledge precludes need for pre-defined data of the regions at training time.

Thus, the spectrogram of the audio signal may be partitioned into regions, such as a context region and a target region for the anomalous sound detection. The context region may include selected time-frequency units in the spectrogram. The target region corresponds to predicted time-frequency units in the spectrogram for the anomalous sound detection. In some embodiments, the neural network may be trained by randomly or pseudo-randomly selecting different partitions of training spectrograms into the context and target regions. The trained spectrograms may correspond to anomalous sounds that may be used to create a library of anomalous spectrograms. The library of anomalous spectrograms may be used to identify target regions that are difficult-to-predict in a spectrogram during testing of the neural network. In some embodiments, the identified target regions may be utilized as one or multiple hypotheses to determine a maximum anomaly score. The maximum anomaly score corresponds to a highly potential anomalous region (i.e., an anomalous sound) in the spectrogram. In some embodiments, the one or multiple hypotheses may include a middle frame hypothesis procedure for recovering a temporal middle portion of the spectrogram, a frequency masking hypothesis procedure for recovering certain frequency regions of the spectrogram from high or low frequency regions of the spectrogram, a frequency masking hypothesis procedure for recovering individual frequency region from neighboring and harmonically related frequency regions in the spectrogram, an energy based hypothesis procedure for recovering high energy time frequency units of the spectrogram, a procedure for recovering a randomly selected subset of masked frequency regions and time frames of the spectrogram, a likelihood bootstrapping procedure for executing different context regions of the spectrogram and recovering an entire spectrogram with high reconstruction likelihood and an ensembling procedure that may combine the above hypothesis generation procedures find the maximum anomaly score.

Further, during the testing of the neural network, multiple partitions of the spectrogram may be produced and corresponding anomaly scores may be determined based on a predetermined protocol, such as computing a mean square error, a Gaussian log-likelihood, or any other statistical representation of the reconstruction error. The maximum anomaly score may be determined from the anomaly scores, which may be used for detecting the anomalous sound. After the detection of the anomalous sound, a control action may be performed.

Some embodiments disclose an iterative approach for determining regions that may be difficult-to-reconstruct from the spectrogram. To that end, the spectrogram may be partitioned into different combinations of context and target regions to produce a set of context regions and a corresponding set of target regions. The set of context regions is submitted to the neural network. The neural network may be executed multiple times to process the set of context regions. In particular, the neural network is executed once for each context region in the set of context regions to produce a recovered target region. Each recovered target region obtained from each execution of the neural network may be summed to obtain a set of recovered target regions. The set of recovered target regions may be compared with the set of target regions to obtain a set of anomaly scores. More specifically, each of the set of recovered target regions is compared with the corresponding target region of the set of target regions. The comparison determines a reconstruction error between each of the set of recovered target regions and each of the set of target regions. The reconstruction error may be used over the target region as the anomaly score. In some embodiments, the anomaly score may correspond to an average or a combined anomaly score that may be determined based on a pooling operation on the set of the anomaly scores. The pooling operation may include an averaging pooling operation, a weighted averaging pooling operation, a maximum (max) pooling operation, a median pooling operation, or the like.

In some embodiments, the combined anomaly score may be used as a first anomaly score to further partition the spectrogram into another context and target regions. The context region is processed by the neural network to output a recovered target region. The recovered target region is compared with the partitioned target region to obtain a second anomaly score. The first and second anomaly scores may be combined using the pooling operation to obtain a final anomaly score. The final anomaly score may be used for the anomalous sound detection and accordingly perform a control action based on the final anomaly score. The neural network may process the context region using the attentive neural network architecture.

In some embodiments, the attentive neural process architecture may include an encoder neural network, a cross attention module and a decoder neural network. The encoder neural network may be trained to accommodate an input set of arbitrary size. Each element of the input set may include values and coordinates of elements of the context region. The encoder neural network may further output an embedding vector for each element of the input set. In some example embodiments, the encoder neural network may use self-attention mechanism to jointly encode all elements of the context region. The self-attention mechanism corresponds to an attention mechanism that enables interaction or relating each of the elements to compute an encoded representation of the elements of the context region.

The cross attention module may be trained to compute a unique embedding vector for each element of the target region by attending to the embedding vectors of the elements of the context region at neighboring coordinates. In some example embodiments, the cross attention module may use a multi-head attention for computing the unique embedding vector. The multi-head attention may run an attention mechanism for computing the embedding vectors in parallel. The decoder neural network outputs a probability distribution for each element of the target region. The probability distributed may be obtained from coordinates of the target region and the embedding vector of corresponding element in the target region. In some example embodiments, the decoder neural network outputs parameters of the probability distribution. The probability distribution may correspond to a conditionally independent Gaussian distribution. In some other example embodiments, the decoder neural network may output parameters of the probability distribution that may correspond to a conditionally independent mixture of Gaussian distribution.

Additionally or alternatively, the anomalous sound in the audio signal may be determined using a sliding window on the spectrogram of the audio signal. The sliding window may be processed by the neural network using the attentive neural network architecture to determine the anomaly score for detecting the anomalous sound. The anomalous sound detection is completed in the sliding window, which may improve speed of detecting the anomalous sound.

Accordingly, one embodiment discloses a computer-implemented method for detecting anomalous sound. The method includes receiving a spectrogram of an audio signal with elements defined by values in a time-frequency domain. A value of each element of the spectrogram is identified by a coordinate in the time-frequency domain. The method includes partitioning the time-frequency domain of the spectrogram into a context region and a target region. The method includes submitting values of elements of the context region and coordinates of the elements of the context region into a neural network including an attentive neural process architecture to recover values of the spectrogram for elements with coordinates in the target region. The method includes determining an anomaly score for detecting the anomalous sound of the audio signal based on a comparison of the recovered values of the elements of the target region and values of elements of the partitioned target region. The method includes performing a control action based on the anomaly score.

Accordingly, another embodiment discloses a system for detecting anomalous sound. The system includes at least one processor and memory having instructions stored thereon that, when executed by the at least one processor, cause the system to receive a spectrogram of an audio signal with elements defined by values in a time-frequency domain of the spectrogram. A value of each element of the spectrogram is identified by a coordinate in the time-frequency domain. The at least one processor may cause the system to partition the time-frequency domain of the spectrogram into a context region and a target region. The at least one processor may cause the system to submit values of elements of the context region and coordinates of the elements of the context region into a neural network including an attentive neural process architecture to recover values of the spectrogram for elements with coordinates in the target region. The at least one processor may cause the system to determine an anomaly score for detecting the anomalous sound of the audio signal based on a comparison of the recovered values of the elements of the target region and values of elements of the partitioned target region. The at least one processor may further cause the system to perform a control action based on the anomaly score.

Further features and advantages will become more readily apparent from the following detailed description when taken in conjunction with the accompanying drawings.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

FIG. 5A shows an exemplary representation depicting a context region and corresponding target region of a spectrogram of an audio input signal, according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure. Contemplated are various changes that may be made in the function and arrangement of elements without departing from the spirit and scope of the subject matter disclosed as set forth in the appended claims.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

While most of the descriptions are made using machine sounds as a target sound source, the same methods can be applied to other types of audio signals.

System Overview

Figure 1:
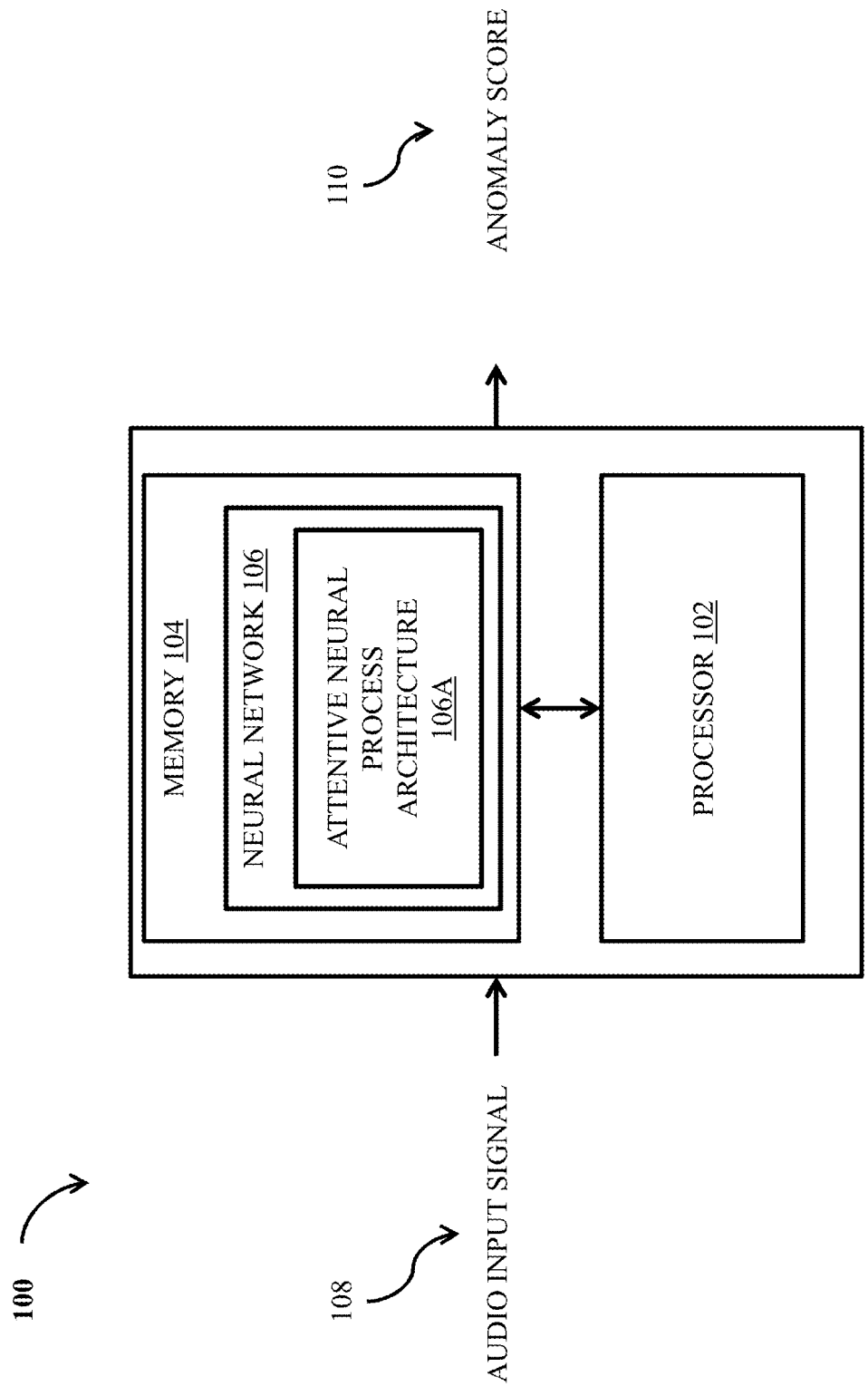
FIG. 1 shows a schematic block diagram of a system for detecting anomalous sound in an audio input signal, according to embodiments of the present disclosure.

FIG. 1 shows a block diagram of a system 100 for detecting anomalous sound in an audio input signal 108, according to embodiments of the present disclosure. The audio processing system 100 referred to hereinafter as system 100 includes a processor 102 and a memory 104. The memory 104 is configured to store instructions for detecting the anomalous sound. In some embodiments the memory 104 is configured to store a neural network 106 for the anomalous sound detection. In some example embodiments, the audio input signal 108 may correspond to non-stationary sounds, such as a human voice, sound of an operating machine, or the like. The audio input signal 108 may be represented into a spectrogram. In some cases, the spectrogram may correspond to a log mel spectrogram that represents an acoustic time-frequency representation of the audio input signal 108.

The processor 102 is configured to execute the stored instructions to cause the system 100 to receive the spectrogram of an audio signal. The spectrogram includes elements defined by values in a time-frequency domain of the spectrogram. A value of each element of the spectrogram 108 is identified by a coordinate in the time-frequency domain. The time-frequency domain of the spectrogram is partitioned into a context region and a target region. The context region corresponds to one or more subsets of time-frequency regions, such as time-frequency units in the spectrogram. The target region corresponds to predicted time-frequency units in the spectrogram that may be used for the anomaly detection.

The values of elements of the context region and coordinates of the elements of the context region are submitted to the neural network 106. The neural network 106 includes an attentive neural process architecture 106A for recovering values for elements with coordinates in the target region. The recovered values may correspond to anomalous sound in the spectrogram. A recovered target region is obtained based on the recovered values. The recovered target region is compared with the partitioned target region to determine an anomaly score for detecting anomalous sound. The anomaly score is a reconstruction error that determines a difference between the recovered target region and the partitioned target region.

In some example embodiments, the attentive neural process architecture 106A may encode the coordinates of each of elements in the context region along with an observed value. The observed value may correspond to a known anomalous behavior of sound, such as screaming of a human voice, clinging sound in machine sounds during operation of the machine.

In some example embodiments, the neural network 106 may be trained by randomly or pseudo-randomly selecting different partitions of training spectrograms into the context and target regions. Additionally or alternatively, the neural network 106 may be trained based on signal properties or prior knowledge, such as known anomalous behavior of sound. For instance, the known anomalous behavior of sound may correspond to anomalous sounds of a damaged part of a machine. Further, during execution of the neural network 106, multiple partitions of the spectrogram and corresponding anomaly scores are generated according to a predetermined protocol. The multiple partitions may be averaged over one or more random context or target regions to obtain an anomaly score for detecting the anomalous sound.

In one example embodiment, the neural network 106 may be trained to partition the spectrogram using a random RowCol selection method. The random RowCol method trains the neural network 106 by randomly selecting one or two time-frames in columns of the spectrogram and up to two frequency bands in row of the spectrogram as the set of target regions. The remaining time-frequency units in the spectrogram are used as the set of context regions.

In another example embodiment, the neural network 106 may be trained using a middle frame selection method. The middle frame selection method selects middle frame $$\left(\text{frame } \frac{L+1}{2}\right)$$

as the target region for an L-frame of the spectrogram. In another example embodiment, the neural network 106 may be trained using a likelihood bootstrapping method. The likelihood bootstrapping method executes multiple forward passes with multiple partitions of the spectrogram into different combinations of context and target regions. The different combinations of context and target regions may be processed by the attentive neural process architecture 106A to recover a target region with values of frames and frequencies that are difficult to reconstruct a potentially anomalous sound in the audio input signal 108.

In some embodiments, the spectrogram may be partitioned into different combinations of context regions and target regions to produce a set of context regions and a corresponding set of target regions. The set of context regions is submitted to the neural network 106. The neural network 106 may be executed multiple times to process the set of context regions. In particular, the neural network 106 is executed once for each context region in the set of context regions to output a recovered target region. The recovered target region is outputted using the attentive neural process architecture 106A. Each recovered target region obtained from each execution of the neural network 106 may be summed into a set of recovered target regions. The set of recovered target regions may be compared with the set of target regions to determine a set of anomaly scores. More specifically, each of the set of recovered target regions is compared with the corresponding target region of the set of target regions. The comparison determines a reconstruction error between each of the set of recovered target regions and each of the set of target regions. The reconstruction error may be used over the target region as the anomaly score, such as anomaly score 110. In some embodiments, the anomaly score 110 may correspond to an average anomaly score that may be determined based on a weighted combination of the set of the anomaly scores.

In some example embodiments, the anomaly score 110 may be defined by an anomaly score function, such as $A_\theta$: $R^{L \times F} \to R$. The anomaly score function learns parameters $\theta$, and the audio input signal 108 (e.g., a sound signal produced by a machine) represented as the spectrogram, i.e., log magnitude spectrogram $Y \in R^{L \times F}$, where L is number of time frames and F is number of frequency bands in the spectrogram. The anomaly score of the spectrogram ($A_\theta(Y)$) may be small for a normal sound and large for the anomalous sound. The anomaly score 110 is used to perform a control action of a desired application. For instance, the anomaly score 110 may be used anomalous sound detection in a Computerized Numerical Control (CNC) machining of a workpiece, anomalous sound detection in ultrasound diagnosis of a patient, an online anomalous sound detection, such as crying sound detection in a baby monitoring application, or the like.

In some cases, some sounds in the audio input signal 108 corresponding to anomalous sounds may be difficult to detect. For instance, sounds generated by a damaged or faulty part of a machine may be anomalous. If the sound of the damage part is lower than other sounds of the machine, then the damaged part sound may difficult to detect as the anomalous sound. In some other cases, the training the anomalous sound detection based on training data of normal sound may not be accurate to detect the anomalous sound in the audio input signal 108. Such anomalous sounds may be difficult to reconstruct from corresponding regions (i.e., time and frequency values of the anomalous sound) of the spectrogram. To the end, the system 100 may partition the spectrogram of the audio input signal 108 into different combinations of context and target regions for the anomalous sound detection, which is further explained next with reference to FIG. 2.

Figure 2:
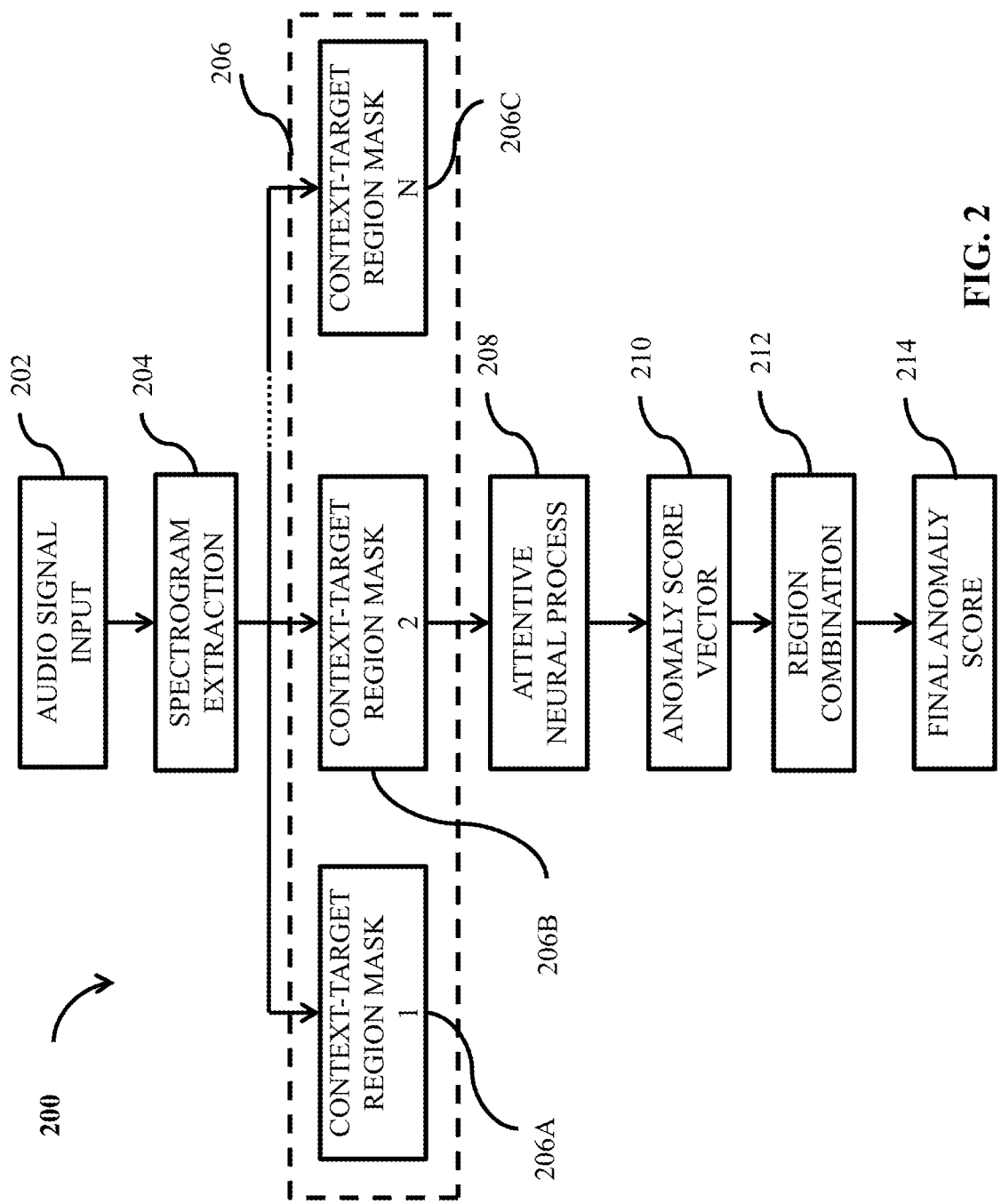
FIG. 2 shows a step-wise process for detecting anomalous sound of an audio signal, according to embodiments of the present disclosure.

FIG. 2 shows a step-wise process 200 for detecting anomalous sound of the audio signal 108, according to embodiments of the present disclosure. The process 200 is executed by the system 100 of FIG. 1. At step 202, the system 100 receives the audio input signal 108. The audio input signal 108 may correspond to a sound produced by a machine, such as the CNC machining of a workpiece. The CNC machine may include a plurality of actuators (e.g., motors) assisting one or multiple tools to perform one or multiple tasks like soldering or assembling the workpiece. Each of the plurality of actuators may produce vibrations may be caused by deformation of the workpiece during the machining of the workpiece during the machining. The vibrations may be mixed with signals from the motors moving a cutting tool of the CNC. The mixed signals may include sounds due to faulty in a part of the CNC, such as a faulty in the cutting tool.

At step 204, the audio input signal 108 is processed to extract a spectrogram of the audio input signal 108. The spectrogram is an acoustic time-frequency domain of the audio input signal 108. The spectrogram includes elements that are defined by values, such as pixels in the time-frequency domain. Each value of each of the elements is identified by a coordinate in the time-frequency domain. For instance, time frames in the time-frequency domain are represented as columns and frequency bands in the time-frequency domain are represented as rows.

At step 206, the time-frequency domain of the spectrogram is partitioned into different combinations of context and target regions. The context region corresponds to one or more subsets of time-frequency regions, such as time-frequency units in the spectrogram. The target region corresponds to predicted time-frequency units in the spectrogram that may be used for the anomaly detection. Each of the different combinations of context and target regions is masked to produce a set of context regions and a corresponding set of target regions. For instance, the set of context regions and the corresponding set of target regions is masked into a set of context-target region masks, such as a context-target region mask$_1$ 206A, a context-target region mask$_2$ 206B and a context-target region mask$_N$ 206N (referred to hereinafter as context-target region masks 206A-206N).

In one example embodiment, the set of context regions and the corresponding set of target regions may be masked based on a random RowCol selection method. The random RowCol selection method randomly selects values in one or two time frames and up to two frequency bands of the spectrogram as the set of target regions. The set of context region correspond to the remaining time-frequency units in the spectrogram. In another example embodiment, the set of context regions and the corresponding set of target regions may be masked based on the middle frame selection method. The middle frame selection method selects middle frame $$\left(\text{frame } \frac{L+1}{2}\right)$$

in the spectrogram as the set of target regions for an L number of frames of the spectrogram. In yet another example embodiment, the set of context regions and the corresponding set of target regions may be masked based on a likelihood bootstrapping method. The likelihood bootstrapping method may execute multiple forward passes of values of the spectrogram to perform multiple partitions of the spectrogram into different combinations of context and target regions, such as the context-target region masks 206A-206N.

Further, the context-target region masks 206A-206N are inputted to the neural network 106. The neural network 106 processes the context-target region masks 206A-206N using the attentive neural process architecture 106A.

At step 208, the attentive neural process architecture 106A is executed multiple times to process context regions in the context-target region masks 206A-206N. Each context region of the set of context-target region masks 206A-206N is executed once to output a corresponding recovered target region. Each recovered target region is summed to form a set of recovered target regions. Each of the set of recovered target regions is compared with corresponding target region in the set of context-target region masks 206A-206N.

At step 210, a set of anomaly scores is determined based on the comparison. The set of anomaly scores may be represented as an anomaly score vector. The anomaly score vector summarizes information in the set of context regions that may be most relevant to each frequency bin in the set of target regions.

At step 212, the summarized anomaly score vector is concatenated with a vector position of corresponding target region of the set of target regions using the attentive neural process architecture 106A to obtain a combined region of the target region. In particular, a region combination may be performed on the anomaly score vector to obtain the combined region. Each element of the anomaly score vector corresponds to an anomaly score for a recovered target region. In some example embodiments, the region combination may be performed using a pooling operation, such as an averaging pooling operation, a weighted averaging pooling operation, a maximum (max) pooling operation, a median pooling operation, or the like.

At step 214, a final anomaly score, such as the anomaly score 110 is obtained. The final anomaly score corresponds to regions that are anomalous in the spectrogram. In some example embodiments, the final anomaly score may be determined based on a weighted combination of the set of anomaly scores. For instance, the set of anomaly scores may be averaged to obtain the final anomaly score.

The final anomaly score may be used for further partitioning the spectrogram to determine regions that may be difficult to reconstruct from the spectrogram. The partitioning of the spectrogram using the final anomaly score is further described in detail with reference to next FIG. 3.

Figure 3:
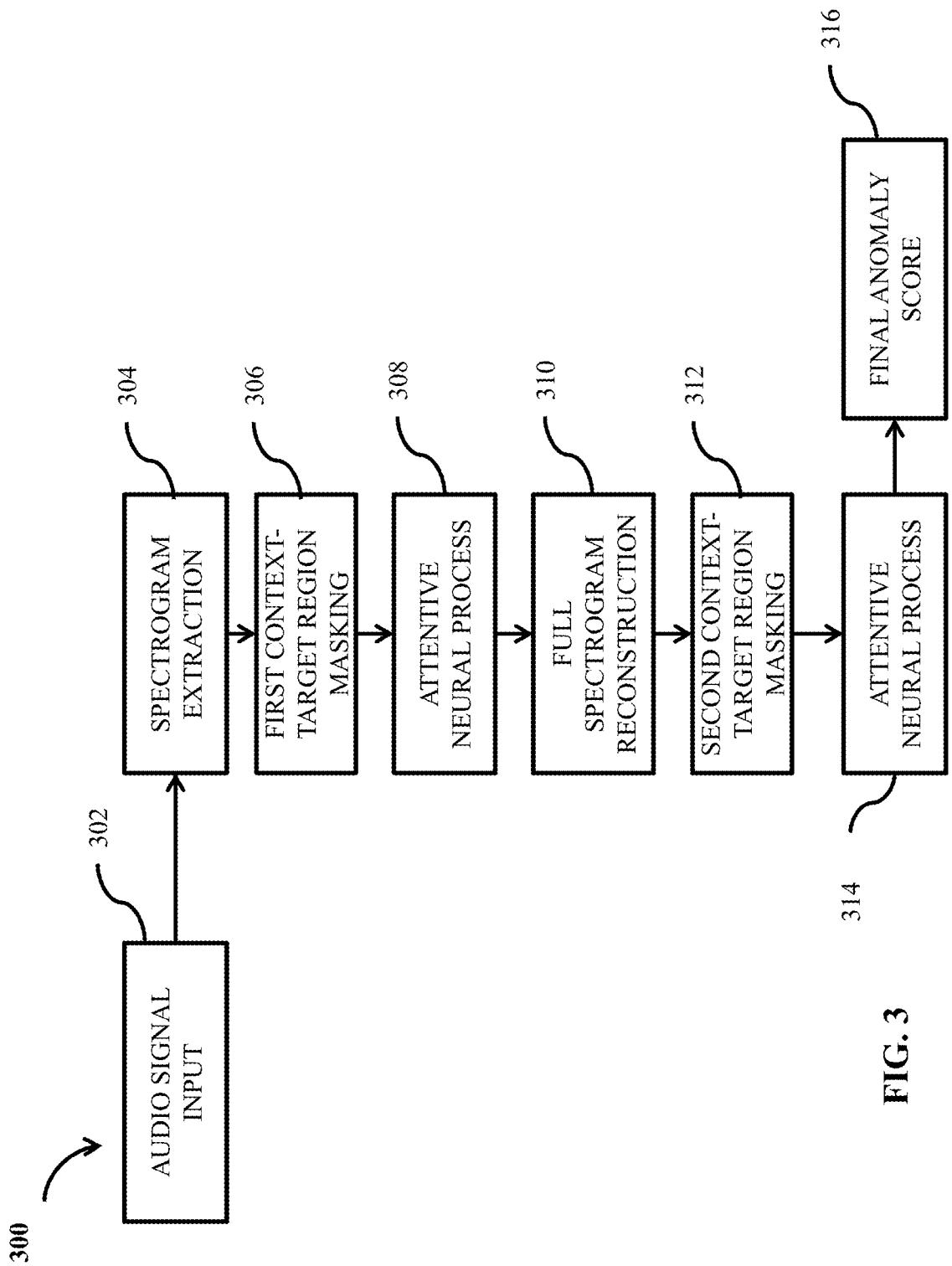
FIG. 3 shows a step-wise process for detecting anomalous sound of an audio signal, according to some other embodiments of the present disclosure.

FIG. 3 shows a step-wise process 300 for detecting anomalous sound of the audio input signal 108, according to some other embodiments of the present disclosure. The process 300 is performed by the system 100. At step 302, the audio input signal 108 is received. At step 304, a spectrogram is extracted from the audio input signal 108. The step 302 and step 304 are similar to the step 202 and step 204 of the process 200.

At step 306, the spectrogram is partitioned into a first context region and a corresponding first target region. The first context region and the first target region are masked to produce a first context-target region mask. The first context region and the first target region may be masked based on one of the random RowCol selection method, the middle frame selection method, the likelihood bootstrapping method or the like. The first context-target region mask is inputted to the neural network 106. The neural network 106 uses the attentive neural process architecture 106A for processing the first context-target region mask.

At step 308, the attentive neural process architecture 106A is executed to process the context region in the first context-target region mask and output a recovered target region from the context region. The recovered target region is compared with corresponding target region in the first context-target region mask. The comparison between the target region and the recovered target region determines a first anomaly score. In some example embodiments, the execution of the neural network may be repeated with values and coordinates of the second context region to recover a second target region. The values and coordinates may correspond to time-frequency units of the second context region in the spectrogram.

At step 310, the time-frequency units of the second context region may be sampled based on the full spectrogram recovered by the attentive neural process. In some example embodiments, the recovered spectrogram may include time-frequency units with low reconstruction likelihood of the original spectrogram.

At step 312, the first anomaly score is used to identify a second partition of the spectrogram, i.e., the recovered spectrogram. In particular, the second partitioned may be performed by comparing the recovered spectrogram obtained at step 310 with the original spectrogram obtained at step 304. To that end, the recovered spectrogram is partitioned into a second context region and a second target region based on the second partition. The second target region may include regions of the original spectrogram with high reconstruction likelihood and the second target region may include regions with low reconstruction likelihood of the original spectrogram. Further, the second context region and the second target region are inputted to the neural network 106. The neural network 106 processes the second context region using the attentive neural process architecture 106A.

At step 314, execution of the attentive neural process architecture 106A is repeated with values and coordinates of the second context region to output a recovered second target region. The recovered second target region is compared with the partitioned second target region to determine a second anomaly score.

At step 316, the second anomaly score is outputted as a final anomaly score. The final anomaly score may be used to detect the anomalous sound and perform a control action for the detected anomalous sound. In some other embodiments, the control action may be performed based on a combination of the first anomaly score and the second anomaly score or both.

In some cases, a maximum anomaly score may be determined by utilizing the recovered target regions as one or multiple hypotheses. The one or multiple hypotheses are described in corresponding FIGS. 4A and 4B, FIGS. 5A, 5B, 5C, 5D and 5E. The determination of the maximum anomaly score based the recovered target regions, is further explained in FIG. 6.

Figure 4A:
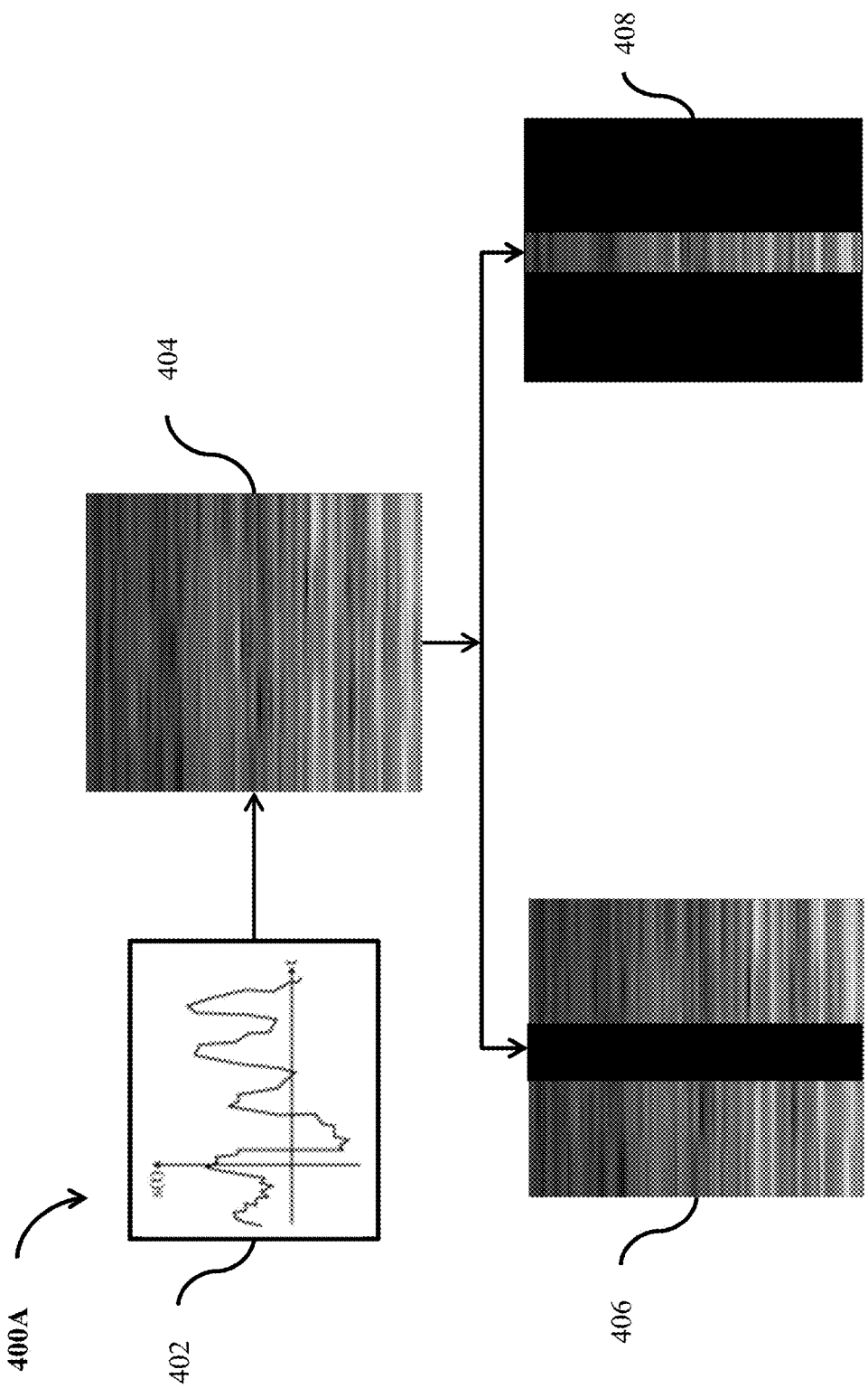
FIG. 4A shows an exemplary representation depicting a context region and corresponding set of target regions of a spectrogram of an audio signal, according to embodiments of the present disclosure.

FIG. 4A shows an exemplary representation 400A depicting a set of context regions 406 and corresponding set of target regions 408 of a spectrogram 404 of an audio input signal 402, according to embodiments of the present disclosure. The audio input signal 402 is an example of the audio input signal 108. The system 100 extracts the spectrogram 404 from the audio input signal 402. The spectrogram 404 includes elements defined by values in a time-frequency domain. Each value of the elements of the spectrogram 404 corresponds to a coordinate in the time-frequency domain. The time-frequency domain of the spectrogram 404 is partitioned into a set of context regions 406 and a set of target regions 408. The set of context regions 406 corresponds to one or more subsets of time-frequency units in the spectrogram 404. The set of target regions 408 corresponds to predicted time-frequency units in the spectrogram 404.

In some example embodiments, the spectrogram 404 is a log mel spectrogram. The spectrogram 404 may be partitioned into different combinations of context and target regions. In some example embodiments, the spectrogram 404 may be masked to produce the set of context regions 406 and the set of target regions 408. For instance, the set of context regions 406 may mask one or more time frames from the spectrogram 404 by using vertical bars, as shown in FIG. 4A. The one or more time frames may be masked randomly to obtain the set of context regions 406. The set of context regions 406 is denoted as, $C=(x_c, y_c)=\{(x_{c_j}, y_{c_j})\}_{j=1}^{C}$ The set of target regions 408 is denoted as $T=(x_T, y_T)=\{(x_{t_j}, y_{t_j})\}_{j=1}^{T}$.

Further, the set of context regions 406 is submitted to the neural network 106. The neural network 106 executes the attentive neural process architecture 106A to process the set of context regions 406 and output a recovered target region of the spectrogram 404.

In some cases, the audio input signal 402 may correspond to a long audio signal that may include anomalous sounds, such as transient disturbances in the audio input signal 402. In such cases, a sliding window procedure may be used to determine the anomalies, which is described in FIG. 4B.

Figure 4B:
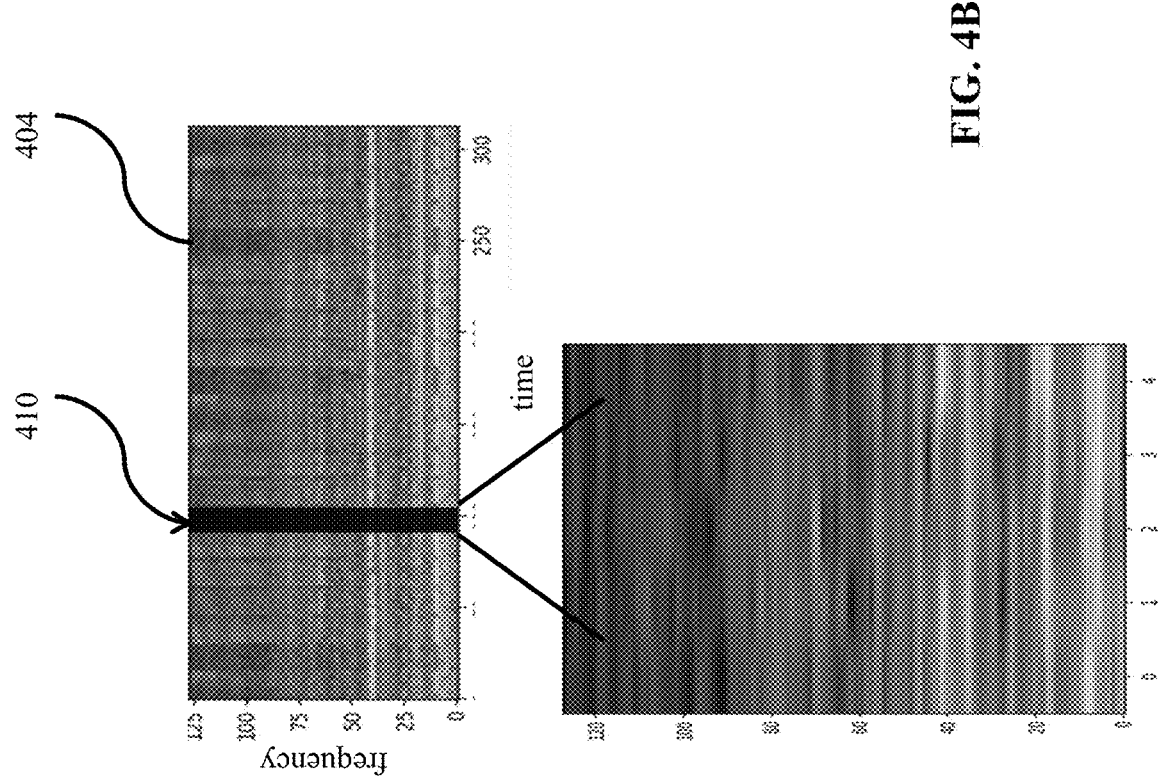
FIG. 4B shows an exemplary representation depicting a sliding window on a spectrogram of an audio signal, according to some embodiments of the present disclosure.

FIG. 4B shows an exemplary representation 400B depicting a sliding window 410 on the spectrogram 404 of the audio input signal 402, according to some embodiments of the present disclosure. The audio input signal 402 may include a long audio signal. For instance, the spectrogram 404 of the audio input signal 402 may include a frame length of 1024 samples with 512 hop length between successive frames, such as columns of the spectrogram 404 and 128 mel bands. The sliding window 410 may be inputted to the neural network 106. The neural network 106 may be executed to process the sliding window 410 using the attentive neural process architecture 106A to determine an anomaly score.

In some example embodiments, multiple sliding windows five frames may be used with one frame hop as input for the neural network 106. The multiple sliding windows may be averaged to obtain an anomaly score for each sample in the spectrogram 404. Each anomaly score of the corresponding samples may be combined using the pooling operation to obtain a final anomaly score for detecting the anomalous sounds in the audio input signal 402. The use of the sliding window 410 prevents processing the entire length of the audio input signal 402 as the anomalous sound detection is completed in the sliding window 410.

In some example embodiments, the spectrogram 404 may be partitioned into a set of context regions and corresponding set of target regions that includes masking of frequency bands in the spectrogram 404. Such set of context regions and corresponding set of target regions are shown in FIGS. 5A and 5B.

FIG. 5A shows an exemplary representation 500A depicting a context region 502 and corresponding target region 504 of the spectrogram 404 of an audio input signal 402, according to some other embodiments of the present disclosure. The context region 502 and the target region 504 may be obtained by the middle frame selection method (as illustrated in 400A). For instance, a middle frame of the spectrogram 404 may be selected from L number of frames in time-frequency domain of the spectrogram 404. The middle frame may be determined as frame (L+½) to partition the spectrogram 404 into the context region 502 and the target region 504. The context region 502 may mask a range of consecutive frequency bands by adding horizontal bars in upper portion of the spectrogram 404, as shown in FIG. 5A. The target region 504 may correspond to mask a range of consecutive frequency bands by adding horizontal bars in lower portion of the spectrogram 404, as shown in FIG. 5A.

The attentive neural process architecture 106A recovers frequency bands (i.e., a target region) from the context region 502. The recovered frequency bands may correspond to reconstruction of high frequency bands from lower portion of the context region 502. For instance, the high frequency bands may be recovered from lower portion of the context region 502. The lower portion may include low frequency bands in the spectrogram 404. The recovered frequency bands are compared with frequency bands of the target region 504 to obtain an anomaly score (such as the anomaly score 110) for detecting anomalous sound in the audio input signal 402.

Figure 5B:
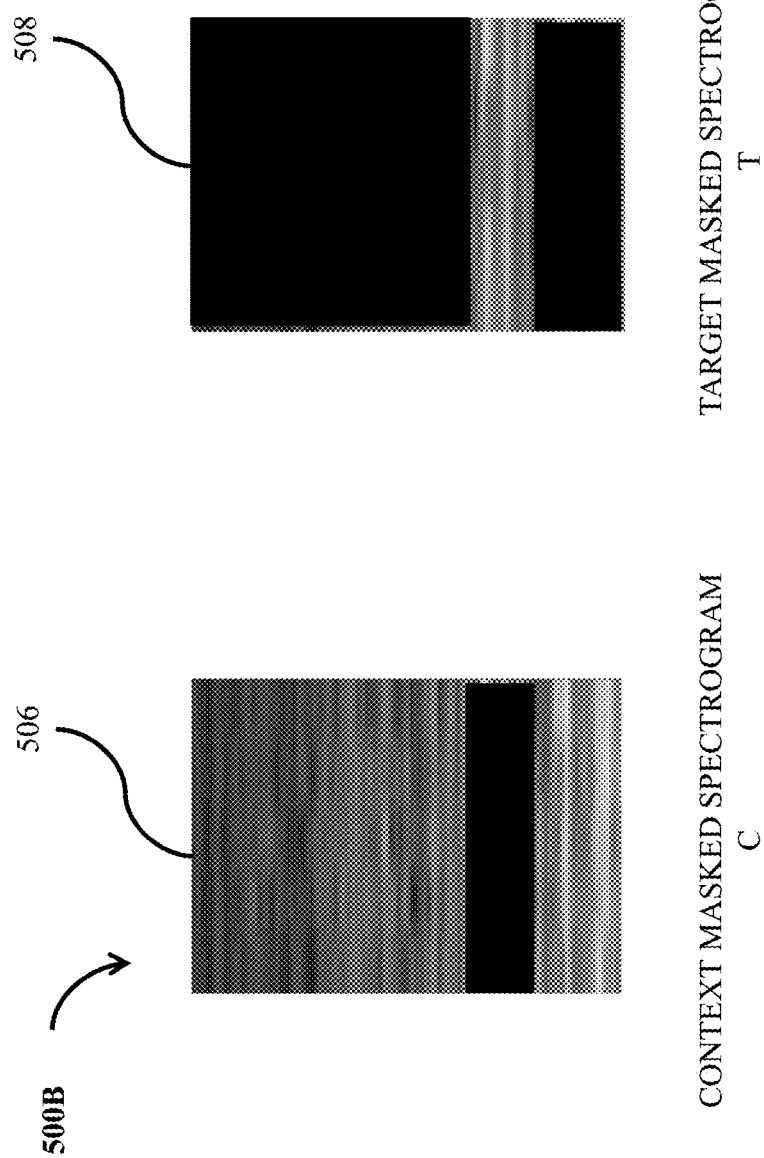
FIG. 5B shows an exemplary representation depicting a context region and corresponding target region of a spectrogram of an audio input signal, according to some other embodiments of the present disclosure.

In some cases, an individual frequency band of the spectrogram 404 may be masked to obtain corresponding context region and target region, which are shown in FIG. 5B.

FIG. 5B shows an exemplary representation 500B depicting a context region 506 and corresponding target region 508 of the spectrogram 404, according to some other embodiments of the present disclosure. In some example embodiments, the spectrogram 404 is partitioned by an individual frequency region to obtain the context region 506 and the target region 508. The context region 506 and the target region 508 may be submitted to the neural network 106. The neural network 106 may process the context region 506 using the attentive neural process architecture 106A. The attentive neural process architecture 106A recovers individual frequency band from neighboring and harmonically related frequency bands in the context region 506. The recovered individual frequency band is compared with frequency band of the target region 508 to determine the anomaly score for detecting anomalous sound in the audio input signal 402.

Figure 5C:
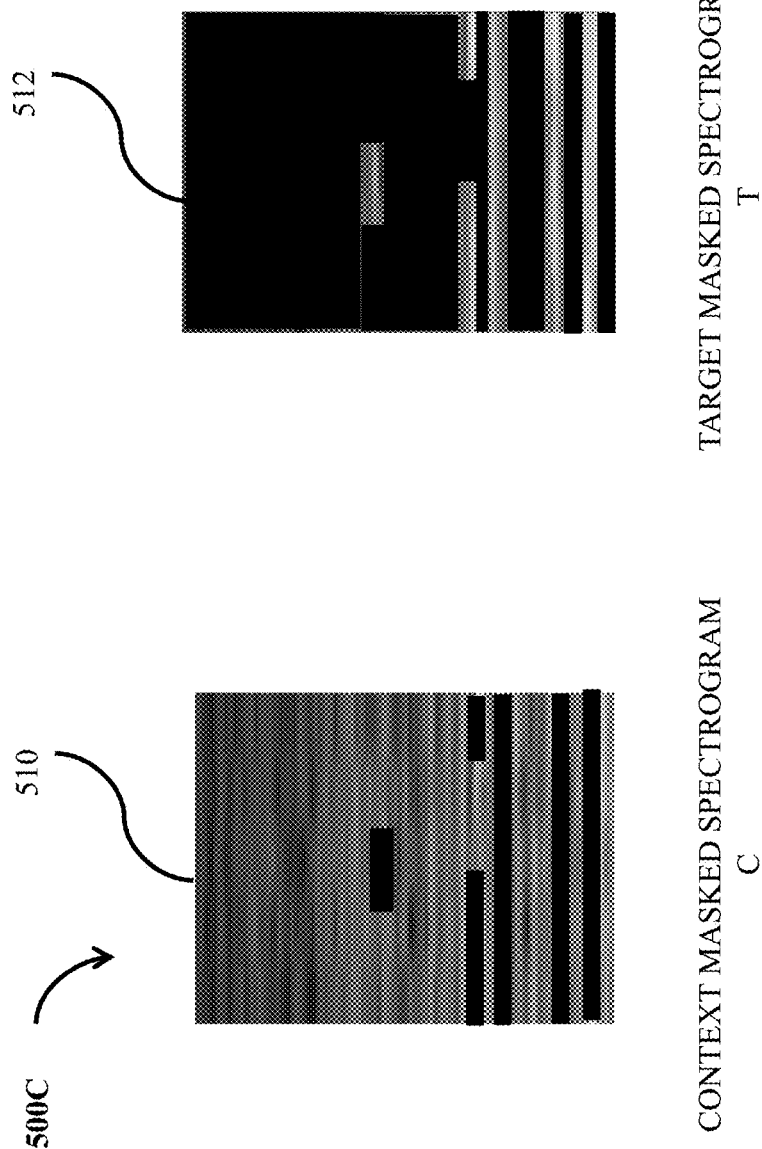
FIG. 5C shows an exemplary representation depicting a context region and corresponding target region of a spectrogram of an audio input signal, according to some other embodiments of the present disclosure.

FIG. 5C shows an exemplary representation 500C depicting a context region 510 and corresponding target region 512 of the spectrogram 404, according to some other embodiments of the present disclosure. In some example embodiments, the spectrogram 404 may be partitioned into multiple regions to obtain the context region 510 and the target region 512, as shown in FIG. 5C. The context region 510 and the target region 512 are submitted to the neural network 106. The neural network 106 uses the attentive neural process architecture 106A to process the context region 510 to recover high energy time frequency units from unmasked time-frequency units of the context region 510. The recovered high energy time frequency units are compared with high energy time frequency units of the target region 512 to determine an anomaly score for detecting the anomalous sound in the audio input signal 402.

Figure 5D:
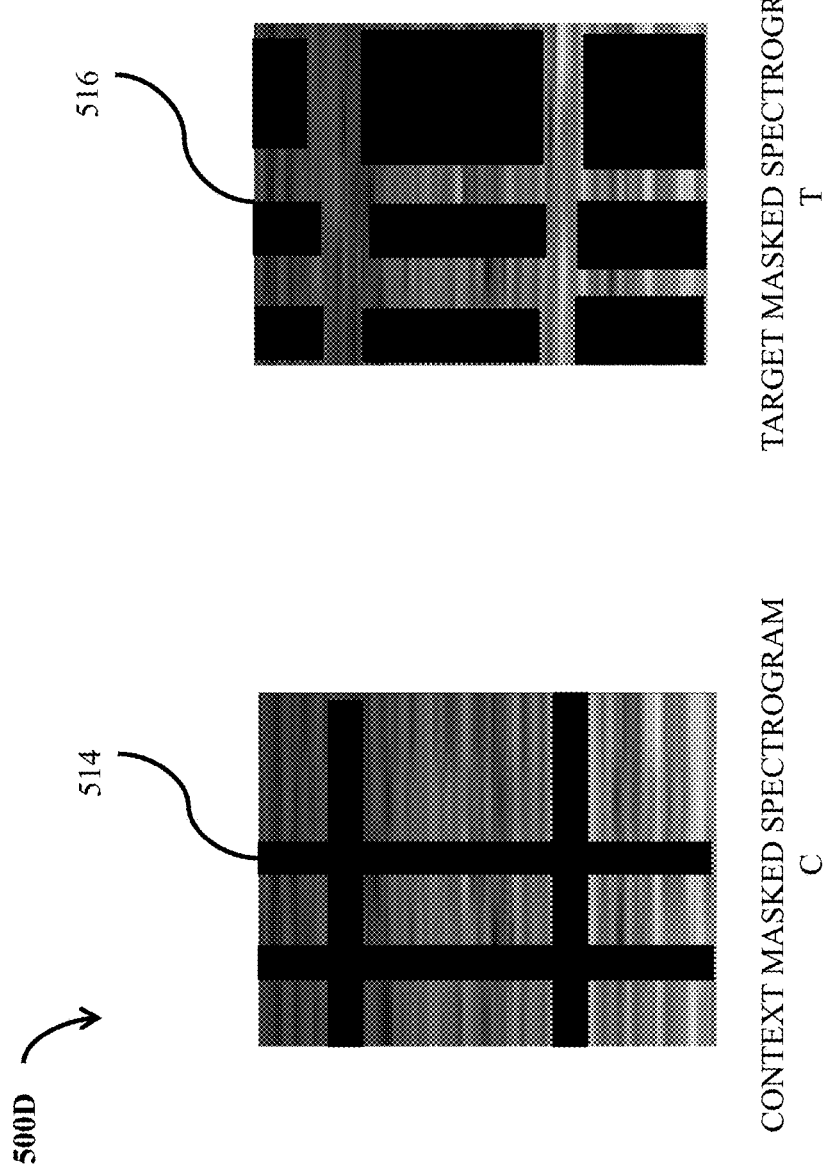
FIG. 5D shows an exemplary representation depicting a context region and corresponding target region of a spectrogram of an audio input signal, according to some other embodiments of the present disclosure.

FIG. 5D shows an exemplary representation 500D depicting a context region 514 and corresponding target region 516 of the spectrogram 404, according to some other embodiments of the present disclosure.

In some example embodiments, the spectrogram 404 is partitioned by randomly selecting a subset of masked frequency bands and time frames to obtain the context region 514 and the target region 516, as shown in FIG. 5D. The context region 514 and the target region 516 are submitted to the neural network 106. The context region 514 is processed using the attentive neural process architecture 106A to recover a randomly selected subset of masked frequency bands and time frames from the context region 514. The recovered subset of masked frequency bands and time frames are compared with a subset of masked frequency bands and time frames of the target region 516 to determine the anomaly score for detecting the anomalous sound in the audio input signal 402.

Figure 5E:
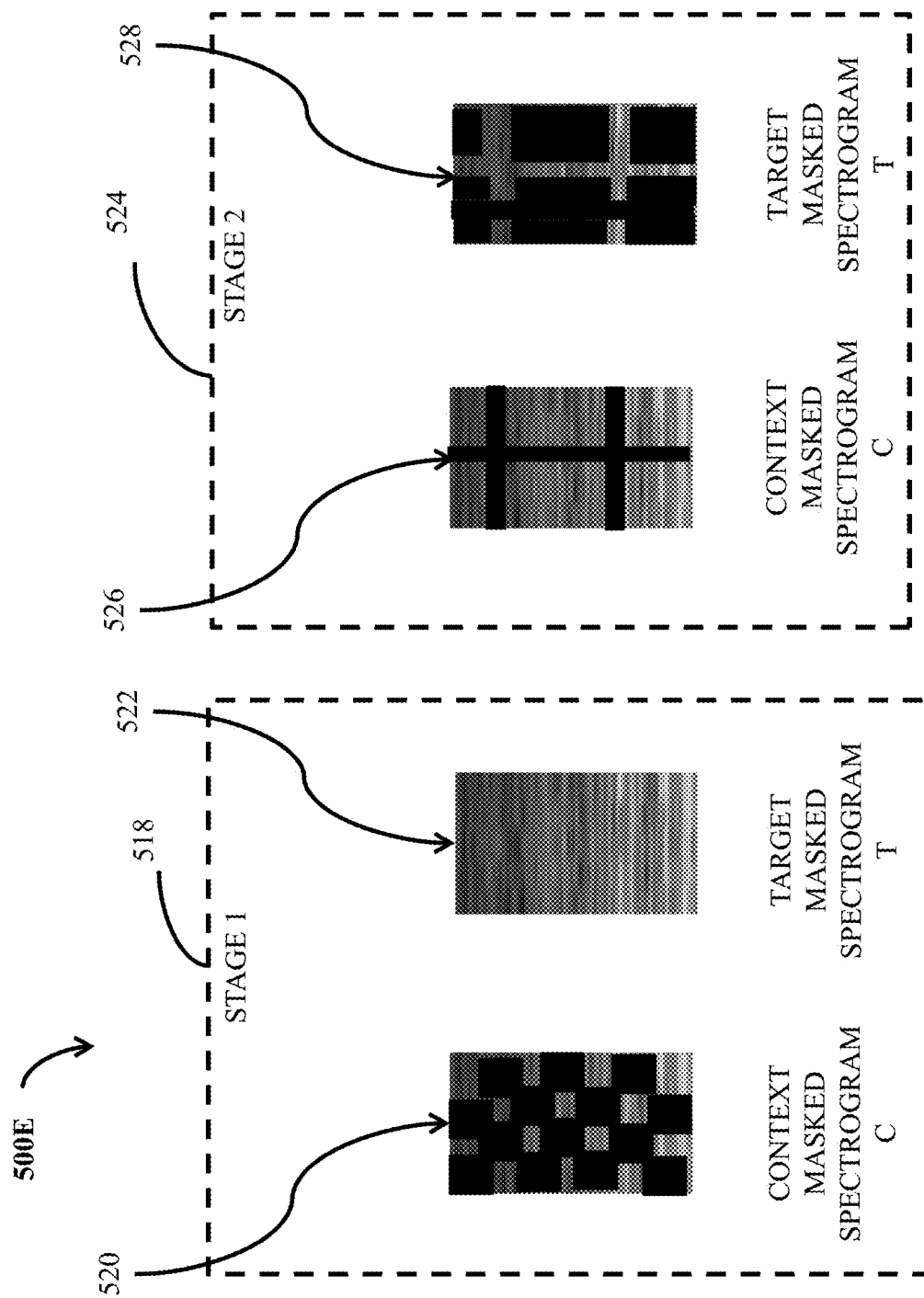
FIG. 5E shows an exemplary representation depicting a context region and corresponding target region of a spectrogram of an audio input signal, according to some other embodiments of the present disclosure.

FIG. 5E shows an exemplary representation 500E depicting multiple partitions of the spectrogram 404, according to some other embodiments of the present disclosure. In some example embodiments, the spectrogram 404 may be partitioned into different combinations of context and target regions. The different combinations of context and target regions may correspond to time-frequency units in the spectrogram 404 that are distinguishable from time-frequency units of normal sounds in the spectrogram 404. The partition of the spectrogram herein is referred to as a stage 518. In the stage 518, the spectrogram 404 may be sampled in different percentage of time-frequency units as context region, such as a context region 520. In some example embodiments, the time-frequency units of the spectrogram 404 may be downsampled in a uniform manner. The spectrogram 406 may be downsampled to removes samples from the audio input signal 108, while maintaining corresponding length of the audio input signal 108 with respect to time. For instance, the time-frequency units of the spectrogram 404 may be sampled at nC=62.5% to obtain the context region 520. The sampled time-frequency units of the context region 520 may be executed in multiple forward passes with multiple partitions of the spectrogram 404. For instance, the sampled time-frequency units of the context region may be processed multiple times to reconstruct an entire spectrogram, such as a reconstructed spectrogram 522, as shown in FIG. 5E.

The reconstructed spectrogram 522 may be compared with the spectrogram 404 to determine a first anomaly score. The first anomaly score may be used to identify a second partition of the time-frequency regions in the spectrogram 404. In some example embodiments, the first anomaly score may be used to perform a dynamic search to determine regions distinguishable from normal sounds. The distinguishable regions may correspond to potentially anomalous sounds in the audio signal. The dynamic search may enable the system 100 to process a portion of the audio signal, while precluding the need to process an entire length of the audio signal. The second partition of the spectrogram 404 is referred to as stage 524, as shown in FIG. 5E.

At stage 524, the spectrogram 522 is partitioned into a second context region, such as a context region 526 and a second target region, such as a target region 528 using the first anomaly score. The context region 526 includes time-frequency units with high reconstruction likelihood in the spectrogram 404. The remaining time-frequency units of the spectrogram 522 may correspond to the target region 528. The context region 526 is submitted to the neural network 106. The neural network 106 may process values and coordinates of the time-frequency units of the context region 526 using the attentive neural process architecture 106A. The attentive neural process architecture 106A recovers a target region with time-frequency units of low reconstruction likelihood. The recovered target region is compared with the target region 528 to determine a second anomaly score. The second anomaly score is used to detect the anomalous sound and perform the control action upon detection of the anomalous sound. In some embodiments, the control action may be performed based on a combination of the first anomaly score and the second anomaly score, or both.

Figure 6:
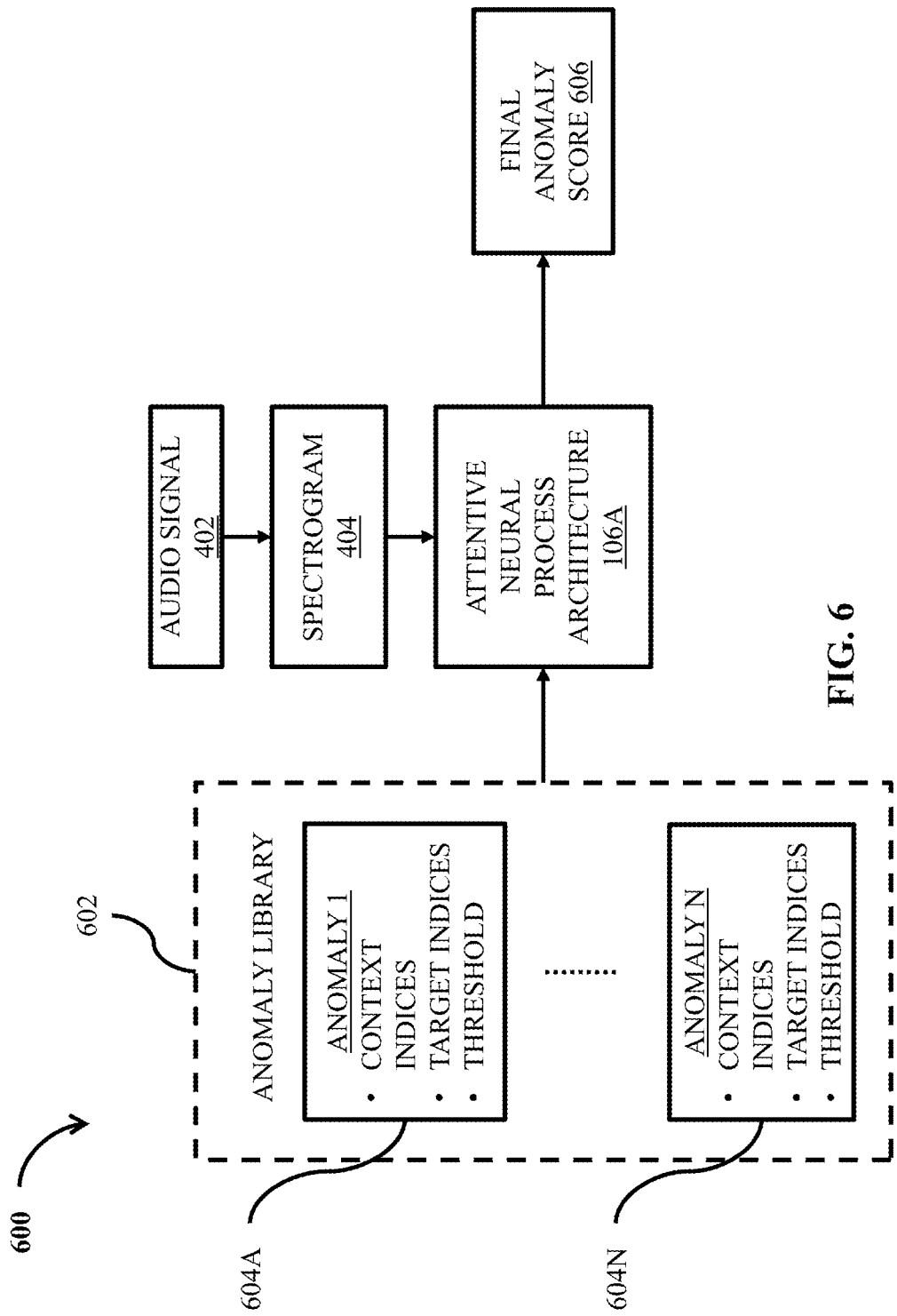
FIG. 6 shows a schematic diagram depicting an anomaly library for detecting anomalous sound in an audio signal, according to some embodiments of the present disclosure.

In some cases, anomalous audio data that includes anomalous behavior of sound, such as vibrational sounds during operation of a machine may be created as a library, which is further explained in FIG. 6.

FIG. 6 is a schematic diagram 600 of a library 602 of anomalous spectrograms, according to some other embodiments of the present disclosure. In some example embodiments, the library 602 of anomalous spectrograms is created based on known anomalous behavior of sounds. For instance, the library 602 may include anomalous data 604A, anomalous data 604N, and/or the like. Each of the anomalous data 604A and anomalous data 604N may include corresponding context regions with context indices, target regions with target indices and threshold that may be compared with corresponding anomaly score 606 to determine whether an anomaly has occurred. In some example embodiments, the threshold may be determined based on a previous observation of anomalous sound detection. For instance, an anomaly score may be determined on a previously observed anomaly score corresponding to a partition of a spectrogram (e.g., the spectrogram 404) into a context region (e.g., the context region 406) and a target region (e.g., the target region 408). The determined anomaly score may be used as the threshold. The threshold may be stored in the library 602 that may be used for detecting an anomaly in any sound sample for the partition of the same spectrogram.

In some embodiments, the library 602 may be used by the attentive neural process architecture 106A for identifying target regions, i.e., time-frequency units from the context regions of the spectrogram 404. The time-frequency units may be difficult to predict in the spectrogram 404 of the audio input signal 402. Such identified target regions may be utilized as one or multiple hypotheses to detect the maximum anomaly score 606.

In some embodiments, the one or multiple hypotheses may be tested to find the target region with the maximum anomaly score 606. The one or multiple hypotheses include a middle frame hypothesis procedure, a frequency masking hypothesis procedure aiming to recover certain frequency regions, a frequency masking hypothesis procedure aiming to recover individual frequency bands, an energy based hypothesis procedure aiming to recover high energy time frequency units from a context region, a procedure aiming to recover a randomly selected subset of masked frequency bands, a likelihood bootstrapping procedure (as described in FIG. 5E) and an ensembling procedure. The ensembling procedure may be used for combining multiple of the above hypothesis generation procedures to find the maximal anomaly score 606.

In some embodiments, the middle frame hypothesis procedure may be used to recover a temporal middle portion of the spectrogram from side portions of the spectrogram sandwiching the middle portion from opposite sides (described in FIGS. 4A and 4B). The frequency masking hypothesis procedure may be used to recover certain frequency regions of the spectrogram from unmasked surrounding regions, e.g., the context region 502 of the spectrogram (described in FIG. 5A). The unmasked surrounding regions correspond to an upper portion of the spectrogram. The recovery correspond to least reconstruct high frequencies at the upper portion from low frequencies at lower portion of the spectrogram, and reconstruct low frequencies at the lower portion from the high frequencies. The frequency masking hypothesis procedure may be used to recover individual frequency bands from neighboring and harmonically related frequency bands (described in FIG. 5B). The energy based hypothesis procedure may be used to recover high energy time frequency units of the spectrogram from remaining unmasked time-frequency units of the spectrogram (described in FIG. 5C). The procedure may be used to recover a randomly selected subset of masked frequency bands and time frames from the unmasked remaining regions of the spectrogram (described in FIG. 5D). The likelihood bootstrapping procedure may be used to perform multiple passes with different context regions determined by first sampling different percentages of time-frequency units as context region, e.g., the context region 520. The context region is processed by the attentive neural process architecture 106A to reconstruct an entire spectrogram, such as the spectrogram 522 and determine time-frequency units of the reconstructed spectrogram with high reconstruction likelihood (described in FIG. 5E). The time-frequency units are used as context to reconstruct time-frequency regions with low reconstruction likelihood.

Figure 7:
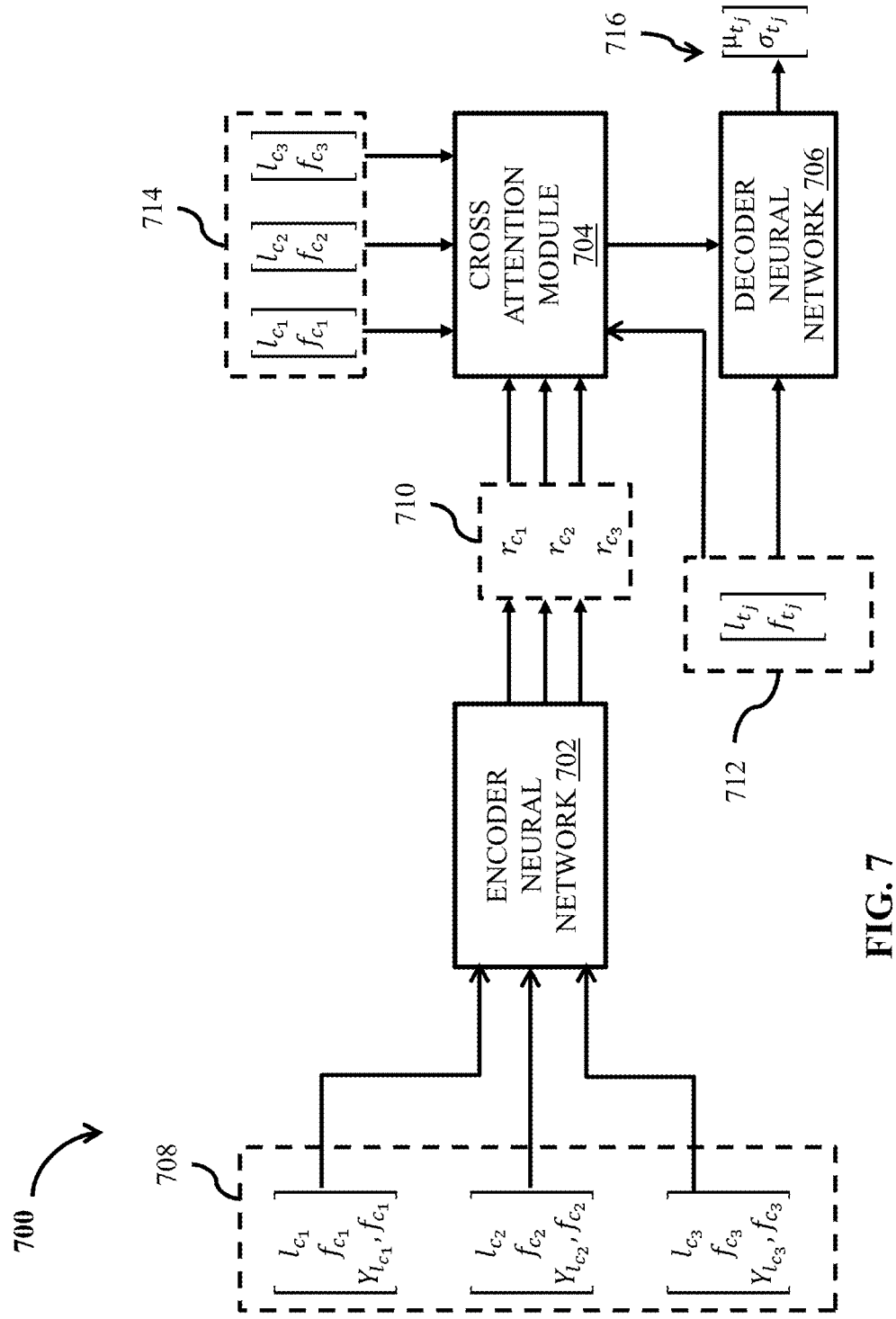
FIG. 7 shows a schematic diagram of an architecture for detecting anomalous sound in an audio signal, according to some embodiments of the present disclosure.

The attentive neural process architecture 106A that recovers a target region for detecting anomalous sound is further explained in FIG. 7.

FIG. 7 shows a schematic diagram depicting a network architecture 700 for detecting anomalous sound, according to some embodiments of the present disclosure. The network architecture 700 corresponds to the attentive neural process architecture 106A. The network architecture 700 includes an encoder neural network 702, a cross-attention module 704 and a decoder neural network 706.

In some embodiments, the network architecture 700 may learn a model for conditional distribution of values of a target region (e.g., the target region 408) ($y_{t_j}$), coordinates ($x_{t_j}$) and the context region 406 (C). Each of the values in the target region 408 may be a conditionally independent Gaussian distribution. The conditionally independent Gaussian distribution at each value in the target region is represented as:

$$p_\theta(y_T \mid x_T, x_c, y_c) = \prod_{j=1}^{T} p_\theta(y_{t_j} \mid x_{t_j}, x_c, y_c) \quad (1)$$

$$= \prod_{j=1}^{T} N(y_{t_j}; \mu_{t_j}, \sigma_{t_j}^2) \quad (2)$$

The network architecture 700 receives values and coordinates 708 that correspond to values of elements of a context region (e.g., the context region 406) and coordinates of the elements of the context region. The values and coordinates 708 may be expressed as, $x_i=[l_i, f_i]^T \in R^2$ that denotes time-frequency coordinates of bin i, and $y_i=Y_{l_i f_i} \in R$ the magnitude at bin i. For instance, the values and coordinates 708 is denoted as $$\begin{bmatrix} l_{c_1} \\ f_{c_1} \\ Y_{l_{c_1}, f_{c_1}} \end{bmatrix} \begin{bmatrix} l_{c_2} \\ f_{c_2} \\ Y_{l_{c_2}, f_{c_2}} \end{bmatrix} \begin{bmatrix} l_{c_3} \\ f_{c_3} \\ Y_{l_{c_3}, f_3} \end{bmatrix},$$

as shown in FIG. 7.

In some embodiments, the encoder neural network 702 may be trained to accommodate an input set of flexible size. Each element of the input set may include the values and coordinates 708. The encoder neural network 702 encodes each of the values and coordinates 708 of the context region 406 along with an observed value to output an embedding vector 710. The observed value may correspond to a known anomalous sound that may be stored in the library 602. In some example embodiments, the encoder neural network 702 may jointly encode elements of nearby coordinates in the values and coordinates 708 of the context region 406 using self-attention to output the embedding vector 710. The embedding vector 710 ($r_{c_j}$) is defined as:

$$r_{c_j} = Enc_\theta([x_{c_j}^T, y_{c_j}^T]^T) \quad (3)$$

The self-attention may estimate parameters, such as parameters 716 that correspond to the conditionally independent Gaussian distribution. To that end, the parameters 716 at each point of the target region 408 may be obtained by inputting concatenated values and coordinates 708 of the context region 406 through the encoder neural network 702.

Further, the embedding vector 710 is inputted to the cross attention module 704. In some embodiments, the cross attention module 704 may be trained to compute a unique embedding vector for each element of the target region 408 by attending to the embedding vector 710 of the context region at neighboring coordinates. The unique embedding vector corresponds to a context vector ($r_{t_j}$) that is computed using a multi-head attention. To that end, the cross attention module 704 may run a query 712 and key 714 that correspond to coordinate positions of the context region 406 to obtain learned positional encodings (i.e., coordinate positions) prior to computing the context vector. The context vector may summarize information of the context region 406 that may be most relevant to each bin $t_j$ in the target region 408 using the multi-head attention. The context vector ($r_{t_j}$) is represented as, $$r_{t_j} = \text{Attention}_\theta(x_{t_j}, x_c, r_c) \quad (4)$$

where, $\text{Attention}_\theta(Q, K, V)$ denotes the multi-head attention. In some example embodiments, the cross attention module 704 may correspond to a two fully-connected layers, such as a normalization layer and a feedforward layer of size 128.

Furthermore, the decoder neural network 706 receives concatenation of the summarized context vector ($r_{t_j}$) from the cross attention module 704 and the query 712. The decoder neural network 706 outputs a probability distribution for each element of the target region 408 based on the context vector that includes coordinates of the target region 408 and the unique embedding vector. In particular, the probability distribution is outputted as the parameters 716 of a conditionally independent Gaussian distribution. In some alternative embodiments, the decoder neural network outputs the parameters 716 of a conditionally independent mixture of Gaussian distribution.

The parameters 716 corresponding to Guassian distribution is denoted as $\mu_{t_j}$ and $\sigma_{t_j}$ for each element of the target region 408. The Gaussian parameters are represented as, $$\mu_{t_j}, \sigma_{t_j} = Dec_\theta([x_{t_j}^T, r_{t_j}^T]^T) \quad (5)$$

The parameters 716 may be trained by maximizing a log-likelihood over multiple spectrograms in a training dataset (D). The log-likelihood may be maximized as:

$$\hat{\theta} = \arg\max E_D[\log p_\theta(y_T|x_T, x_c, y_c)] \quad (6)$$

In some example embodiments, the decoder neural network 706 may include two output units. The first output unit may include a linear activation function for estimating $\mu_{t_j}$ and the second output unit may include a regularized softplus activation function. The regularized softplus activation function avoids the standard deviation collapsing to zero, i.e., $\sigma_{t_j} = 0.1 + 0.9 \cdot \text{softplus}(z)$.

At inference time of the network architecture 700, an anomaly score, such as the anomaly score 610 for a spectrogram, such as the spectrogram 404 is computed as, $$A_{\hat{\theta}}(Y) = -\log p_{\hat{\theta}}(y_T | x_T, x_c, y_c) \propto \sum_{t=1}^{T} \log(\sigma_{t_j}) + \frac{(y_{t_j} - \mu_{t_j})^2}{2\sigma_{t_j}^2} \quad (7)$$

The anomaly score is used over the target region 408 for detecting anomalous sound. A control action may be performed upon detection of the anomalous, which are further described in FIG. 10, FIG. 11 and FIG. 12.

Figure 8:
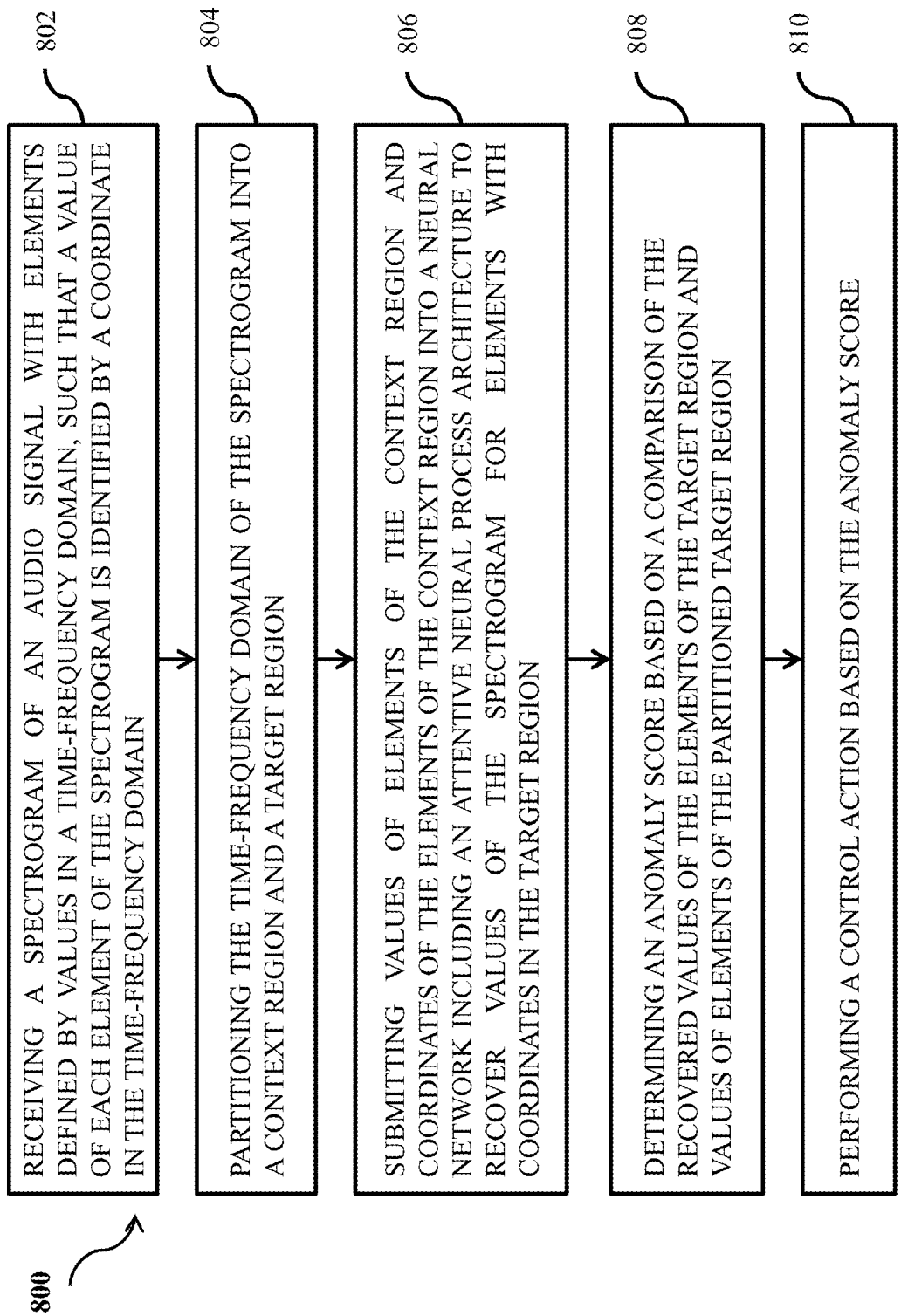
FIG. 8 shows a flow diagram of a method for detecting anomalous sound, according to embodiments of the present disclosure.

FIG. 8 shows a flow diagram of a method 800 for detecting anomalous sound, according to embodiments of the present disclosure. The method 800 is performed by the system 200. At operation 802, the method 800 includes receiving a spectrogram (e.g., the spectrogram 404) of an audio signal (e.g., the audio input signal 402) with elements defined by values in a time-frequency domain. A value of each element of the spectrogram is identified by a coordinate in the time-frequency domain.

At operation 804, the method 800 includes partitioning the time-frequency domain of the spectrogram into a context region and a target region. In some embodiments, the spectrogram is partitioned into different combinations of context regions and target regions to produce a set of context regions and a corresponding set of target regions (refer FIG. 2).

At operation 806, the method 800 includes submitting values of elements of the context region and coordinates of the elements of the context region into a neural network including an attentive neural process architecture to recover values of the spectrogram for elements with coordinates in the target region. In some example embodiments, the neural network may be executed multiple times to process the set of context regions. Each context region in the set of context regions may be executed once to produce a set of recovered target regions. In some embodiments, the neural network is trained by randomly or pseudo-randomly selecting different partitions of training spectrograms into context and target regions.

At operation 808, the method 800 includes determining an anomaly score for detecting the anomalous sound of the audio signal based on a comparison of the recovered values of the elements of the target region and the values of elements of the partitioned target region. In some embodiments, a set of anomaly scores may be determined from the set of recovered target regions. For instance, each of the set of recovered target regions may be compared with a corresponding target region to determine the set of anomaly scores. The anomaly score may be determined based on a weighted combination of the set of anomaly scores.

At operation 810, the method 800 includes performing a control action based on the anomaly score. In some example embodiments, the anomaly score may be used as a first anomaly score to identify a second partition of the spectrogram. The spectrogram may be partitioned into a second context region (e.g., the second context region 526) and a second target region (e.g., the target region 528) using the first anomaly score. The first context region corresponds to time-frequency regions with high reconstruction likelihood in the spectrogram. The context region 526 is submitted to the neural network 106 to recover a target region of the spectrogram. The recovered target region corresponds to time-frequency regions with low reconstruction likelihood of the spectrogram. The recovered target region is compared with the partitioned target region to determine a second anomaly score. The second anomaly score may be used to perform a control action. In some embodiments, the control action may be performed based on a combination of the first anomaly score and the second anomaly score, or both.

Figure 9:
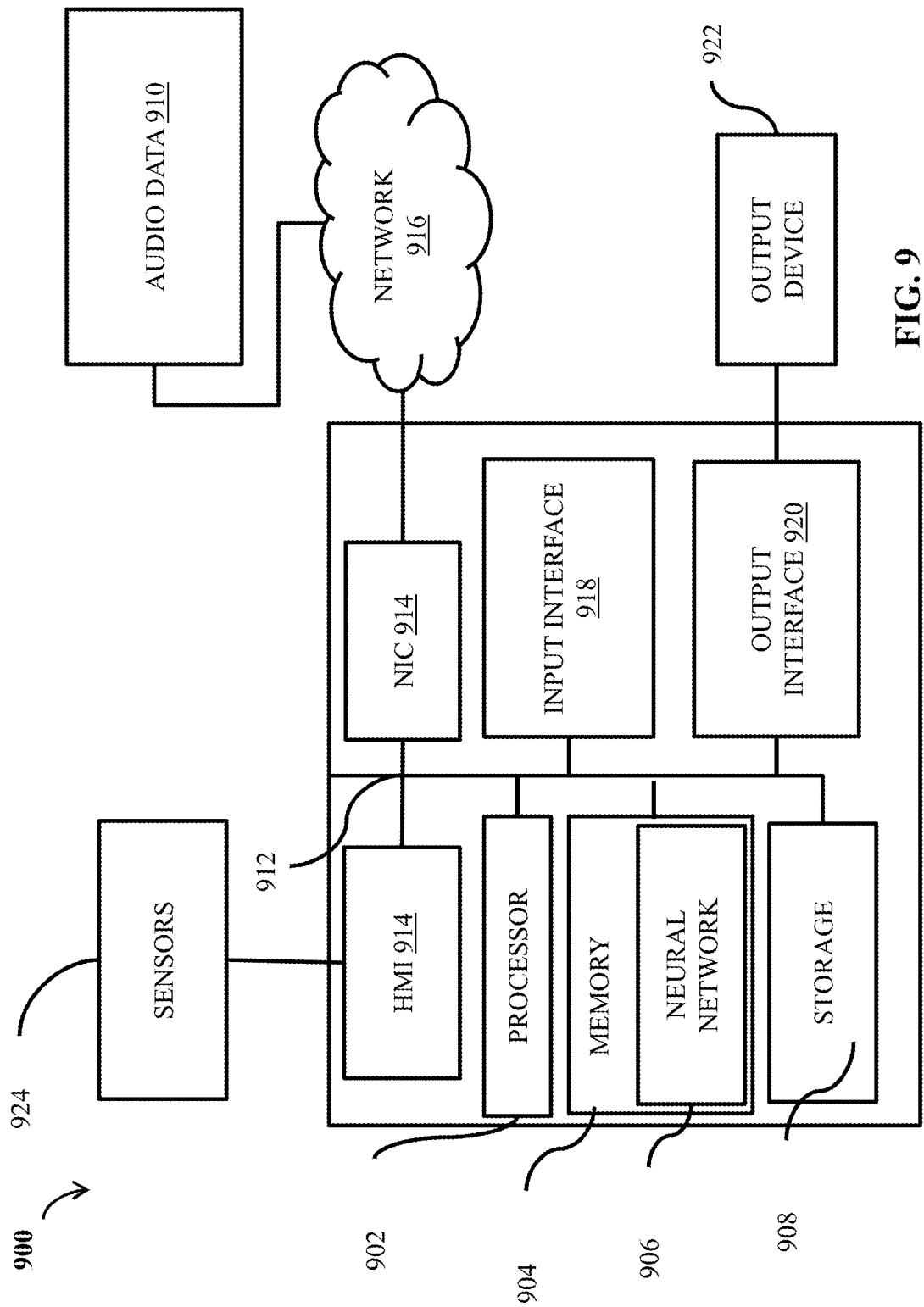
FIG. 9 is a block diagram of a system for detecting anomalous sound, according to embodiments of the present disclosure.

FIG. 9 is a block diagram of an anomalous sound detection system 900, according to embodiments of the present disclosure. The anomalous sound detection system 900 is an example of the system 100. The anomalous sound detection system 900 includes a processor 902 configured to execute stored instructions, as well as a memory 904 that stores instructions regarding a neural network 906. The neural network 906 includes an attentive neural process architecture (e.g., the attentive neural process architecture 106A). In some embodiments, the attentive neural process architecture corresponds to an encoder-decoder model (e.g., the network architecture 700) that includes an encoder neural network (e.g., the encoder neural network 702), a cross-attention module (e.g., the cross-attention module 704) and a decoder neural network (e.g., the decoder neural network 706).

The processor 902 may be a single core processor, a multi-core processor, a graphic processing unit (GPU), a computing cluster, or any number of other configurations. The memory 904 may include random access memory (RAM), read only memory (ROM), flash memory, or any other suitable memory systems. The memory 904 can also include a hard drive, an optical drive, a thumbdrive, an array of drives, or any combinations thereof. The processor 902 is connected through a bus 912 to one or more input and output interfaces/devices.

The anomalous sound detection system 900 may also an input interface 918. The input interface 918 is configured to receive audio data 910. In some embodiments, the anomalous sound detection system 900 may receive the audio data 910 via a network 916 using a network interface controller (NIC) 914. The NIC 914 may be adapted to connect the anomalous sound detection system 900 through a bus 106 to the network 916. In some cases, the audio data 910 may be online data, such as online audio stream received via the network 916. In some other cases, the audio data 910 may be a recorded data stored in a storage device 908. In some embodiments, the storage device 908 is configured to store training dataset for training the neural network 906. The storage device 908 may also be configured to store a library of anomalous sounds, such as the library 602.

In some example embodiments, the anomalous sound detection system 900 may receive audio data from one or more sensors, collectively referred to sensors 924. The sensors 924 may include a camera, an audio receiver, or the like that capture audio signals. For instance, the camera may capture a video of a scene that includes audio information of the scene. The scene may correspond to an indoor environment, or an outdoor environment with audio information of one or more objects or humans in the scene.

The anomalous sound detection system 900 may also include an output interface 920. The output interface 920 is configured to output an anomaly score via an output device 926. The output device 922 may output a detected anomalous sound based on the anomaly score. The output device 922 may include a display screen (e.g., a monitor) of a computer, a laptop, a mobile phone, a smartwatch, or the like. The output device 922 may also include an audio output device (e.g., a speaker) of the computer, the laptop, the mobile phone, the smartwatch, or the like. The anomaly score is used for performing a control action. For instance, the control action may include sending a notification, such as an alarm to an operator of a machine upon detection of the anomalous sound.

Figure 10:
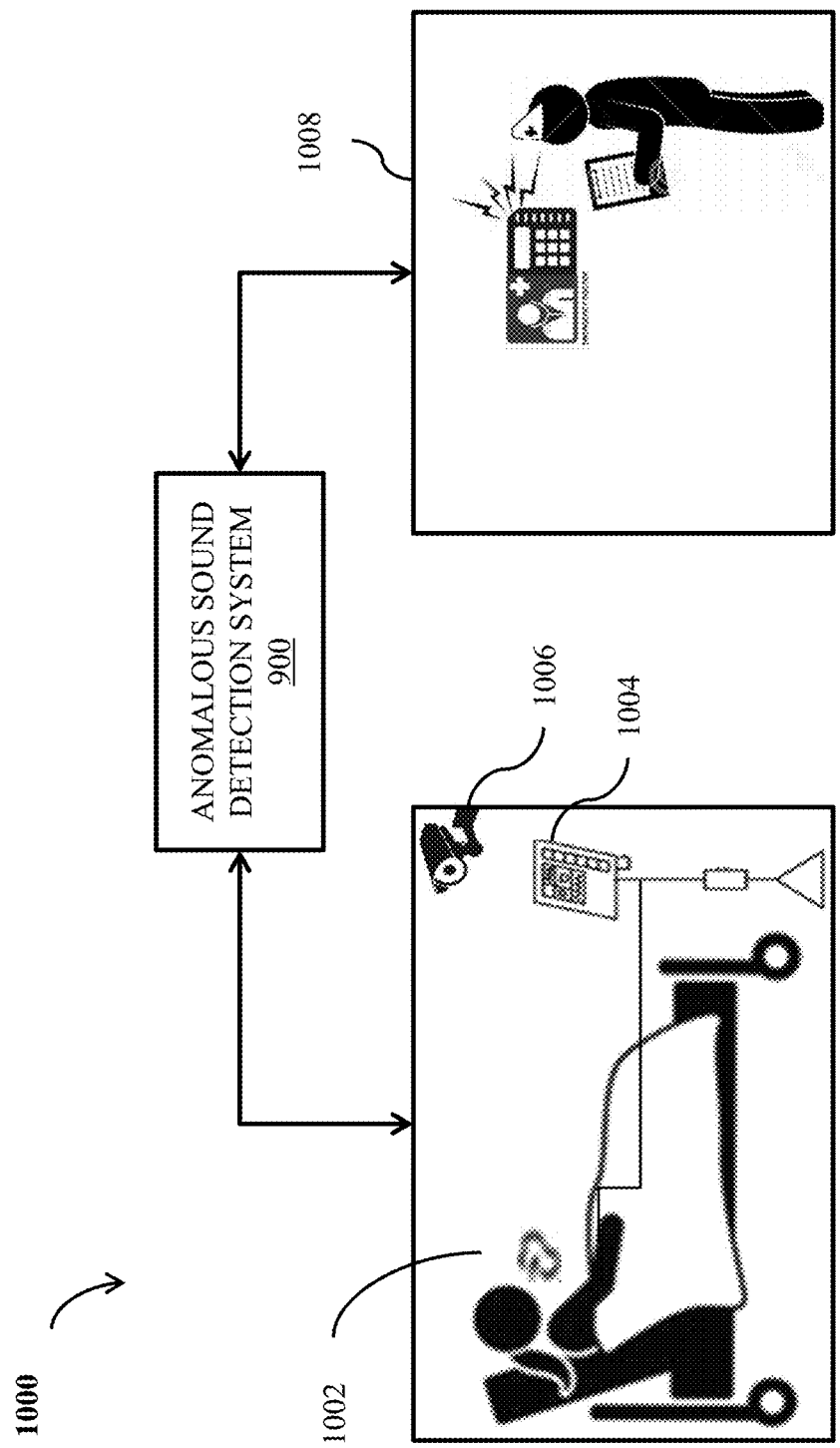
FIG. 10 illustrates a use case for detecting anomalous sound using the system of FIG. 9, according to embodiments of the present disclosure.

FIG. 10 illustrates a use case 1000 for detecting anomalous sound using the anomalous sound detection system 900, according to embodiments of the present disclosure.

In an illustrative example scenario, a patient 1002 is diagnosed or monitored using a machine 1004, such as an ultrasound machine, a heartbeat monitoring machine, or the like. For instance, the machine 1004 monitors heartbeat of the patient 1002. The machine 1004 is connected to the system 100. In some example embodiments, the machine 1004 may be connected to the system 100 via a network. In some other example embodiments, the system 100 may be embodied within the machine 1004. The machine 1004 transmits a monitored data to the system 100. The monitored data may correspond to a recorded audio or a live audio stream corresponding to heartbeat rate of the patient 1002. The system 100 processes the monitored data and computes an anomaly score to determine anomalous sound. When the anomalous sound is detected, the detected anomaly may be reported to an operating room, such as an emergency room 1008 to assist the patient.

In some other cases, the patient 1002 may be monitored by a camera, such as a camera 1006. The camera 1006 is connected to the system 100. The camera 1006 may capture a video of the patient 1002 that may include audio information corresponding to the patient 1002. The audio information may be processed by the system 100 for anomalous sound detection. For instance, the patient 1002 may severely cough during sleep. The audio data that includes corresponding coughing sound may be transmitted to the system 100. The system 100 processes the audio data and computes an anomaly score to detect anomalous sound, such as the coughing sound of the patient 1002. In some cases, the system 100 may utilize the library 602 that include anomalous coughing sound data to detect if the coughing of the patient is anomalous. The emergency room 1008 may be alerted according to such anomaly detected and notify doctors or nurses to assist the patient 1002.

Figure 11:
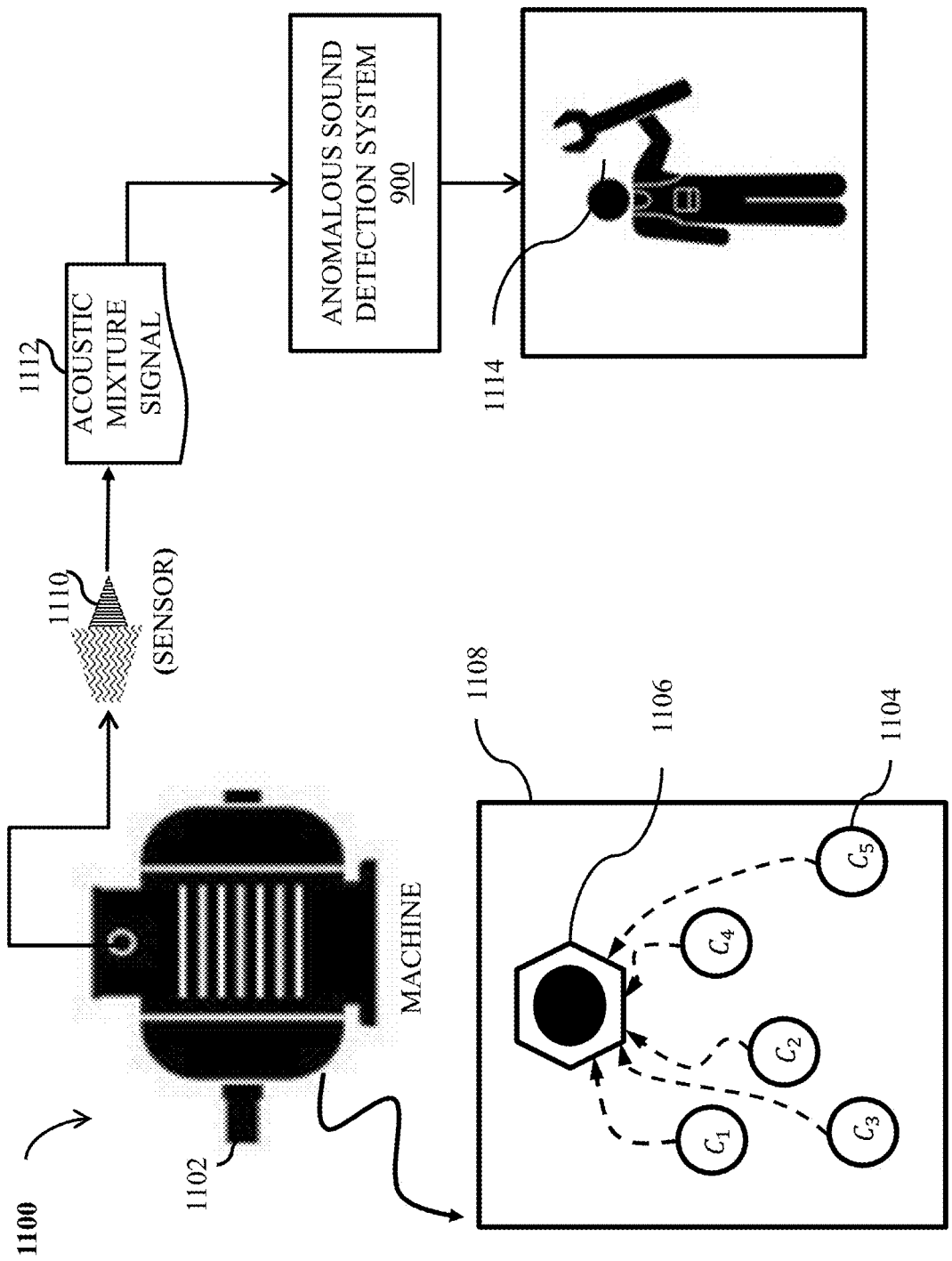
FIG. 11 illustrates a use case for detecting anomalous sound using the system of FIG. 9, according to other embodiments of the present disclosure.

FIG. 11 illustrates a use case 1100 for detecting anomalous sound in a machine 1102 using the anomalous sound detection system 900, according to embodiments of the present disclosure. The machine 1102 may include one or more components (e.g., actuators) collectively referred to as machine components 1104. Each of the machine components 1104 may be performing a unique task and may be connected to a coordinating device 1106. Examples of the tasks performed by the machine components 1104 may include machining, soldering or assembling the machine 1102. In some cases, the machine components 1104 may operate simultaneously, while the coordinating device 1106 may control each of the machine components 1104 individually. Example of the coordinated device 1106 is a tool for performing a task.

The machine 1102 may be connected to a sensor 1110 that includes an audio device, such as a microphone or an array of multiple microphones. The sensor 1110 may capture vibrations produced by each of the machine components 1104 during the operation of the machine 1108. Additionally, some of the machine components 1104 may be co-located in the same spatial area such that the machine components 1104 may not be captured individually by the sensor 1110. The vibrations captured by the sensor 1110 may be recorded as an acoustic mixture signal 1112. The acoustic mixture signal 1112 may include a sum of vibration signals produced by each of the machine components 1104.

The acoustic mixture signal 1112 is transmitted to the using the anomalous sound detection system 900. In some embodiments, a spectrogram (e.g., the spectrogram 404) of the acoustic mixture signal 1112 is extracted by the anomalous sound detection system 900. The spectrogram may include at least some of sound sources that may occupy same time, space, and frequency spectrum in the acoustic mixture signal 1112. The spectrogram of the acoustic mixture signal 1112 is partitioned into context region and a corresponding predicted target region of the spectrogram. The context region is processed by the neural network 906 of the anomalous sound detection system 900. The neural network 906 uses an attentive neural process architecture (e.g., the attentive neural process architecture 106A) to recover time frames and frequency regions of the spectrogram. The recovered time frames and frequency regions are obtained as a recovered target region of the spectrogram. The recovered target region may include lowest reconstruction likelihood values in the spectrogram. Further, the recovered target region and the partition target region are compared to determine an anomaly score. The anomalous sound detection system 900 outputs the anomaly score that is used to detect anomalous sound in the acoustic mixture signal 1112. The detection of the anomalous sound may avoid faults in performing the task, while maintaining smooth operation of the machine 1102. The detected anomalous sound may be notified to an operator 1114 to perform a control action, such as terminating the operation of the machine, notifying a manual intervention, or the like. For instance, the operator 1114 may correspond to an automated operator that may be programmed to terminate the operation of the machine 1102 upon detection of the anomalous sound. In some other cases, the operator 1114 may correspond to a manual operator that may intervene to perform an action, such as replacing one of the machine components 1104, repairing the machine components 1104, or the like.

Figure 12:
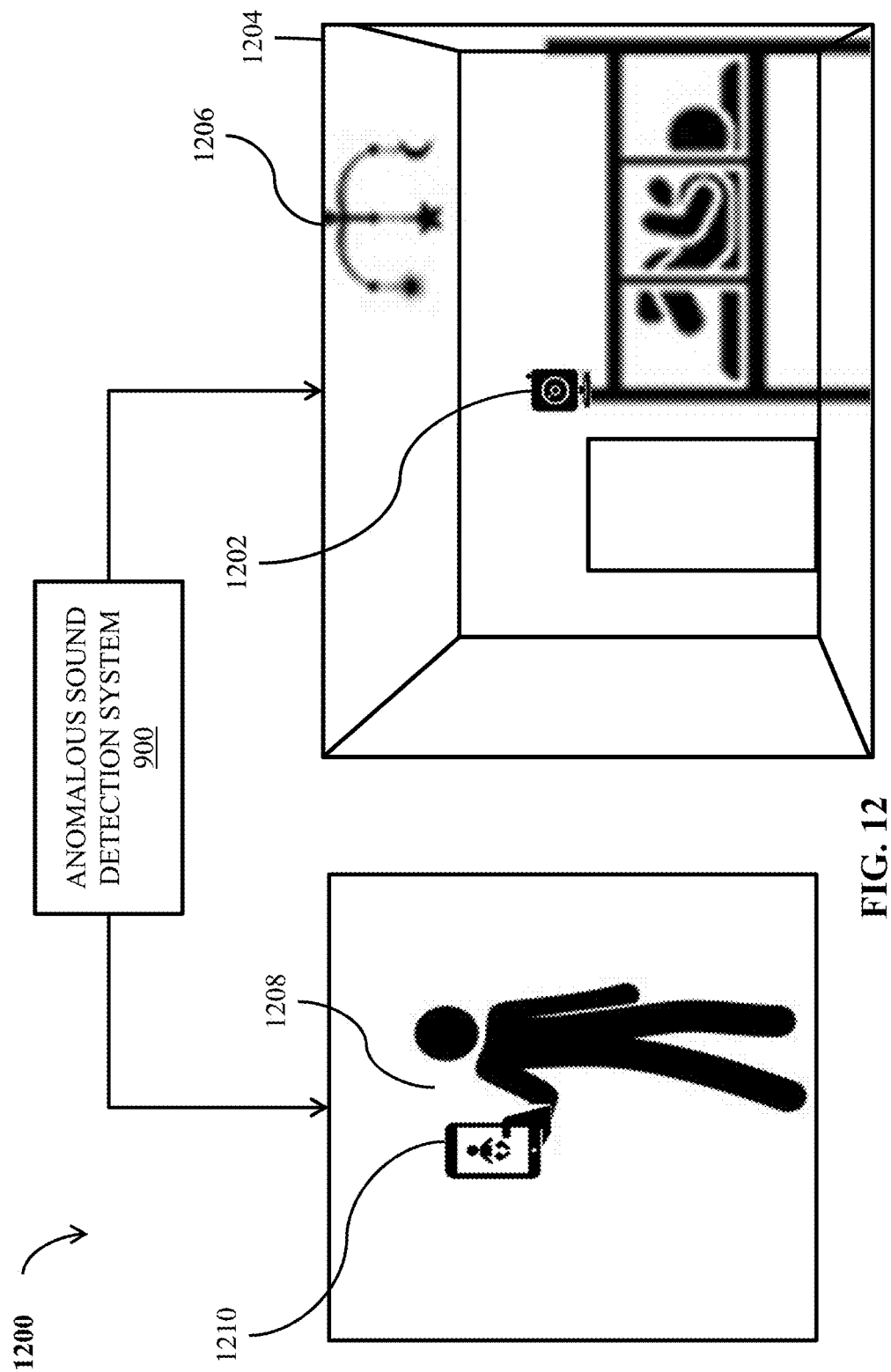
FIG. 12 illustrates a use case for detecting anomalous sound using the system of FIG. 9, according to yet some other embodiments of the present disclosure.

FIG. 12 illustrates a use case 1200 for detecting anomalous sound using the anomalous sound detection system 900, according to embodiments of the present disclosure. In some example embodiments, the anomalous sound detection system 900 may be used in a baby monitoring application. For instance, a baby monitoring device 1202 may be connected to the anomalous sound detection system 900 via a network, such as the network 916. Alternatively, the anomalous sound detection system 900 may be embodied within the baby monitoring device 1202.

In an illustrative example scenario, the baby monitoring device 1202 may be monitoring a baby 1204 in a room 1206. The baby monitoring device 1202 may capture an audio signal that may include a crying sound of the baby, a white noise or a music played in the room, etc. In some instances, the white noise or the music may be louder than the crying sound. The loud white noise or the loud music may prevent the crying sound from being heard by a caretaker 1208 in a different room. In such instances, the baby monitoring device 1202 may send the audio signal to the anomalous sound detection system 900.

The anomalous sound detection system 900 may receive a spectrogram of the audio signal. The spectrogram is partitioned into a context region and a target region. The context region is processed by the neural network 106 using the attentive neural process architecture 106A to recover a target region. The recovered target region may include values and coordinates in a time-frequency domain of the spectrogram that may correspond to the crying sound. The recovered target region is compared with the partitioned target region to determine an anomaly score. The anomaly score may correspond to the crying sound that is detected as anomalous sound by the anomalous sound detection system 900. The detected anomalous sound may be notified to the caretaker 1208 via a user device 1210. For instance, the user device 1210 may include an application interface of the baby monitoring device 1202. The caretaker 1208 may perform an action upon detection of the anomalous sound.

In this manner, the system 100 may be used to detect anomalous sound in an audio signal in an efficient and feasible manner. More specifically, the system 100 may detect the anomalous sound relying on training data that includes only normal data. The system 100 processes audio data that includes both time and frequency information, which may improve accuracy for detecting the anomalous sound. Further, the system 100 is capable of processing the audio data that exhibit time-variance and non-stationary behavior, which makes the system 100 versatile. Furthermore, the system 100 may perform a dynamic search of anomalous regions in the audio data to detect the anomalous sound. The dynamic search may enable the system 100 to process a specific portion of the audio data, which precludes processing an entire length of the audio data and thereby may improve overall computation speed.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The above-described embodiments of the present disclosure may be implemented in any of numerous ways. For example, the embodiments may be implemented using hardware, software or a combination thereof. When implemented in software, the software code may be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Therefore, it is the object of the appended claims to cover all such variations and modifications as come within the true spirit and scope of the present disclosure.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. An audio processing system for detecting anomalous sound, comprising: at least one processor; and memory having instructions stored thereon that, when executed by the at least one processor, cause the system to:
   receive a spectrogram of an audio signal with elements defined by values in a time-frequency domain of the spectrogram, wherein a value of each element of the spectrogram is identified by a coordinate in the time-frequency domain;
   partition the time-frequency domain of the spectrogram into a context region and a target region;
   submit values of elements of the context region and coordinates of the elements of the context region into a neural network including an attentive neural process architecture to recover values of the spectrogram for elements with coordinates in the target region;
   determine an anomaly score for detecting the anomalous sound of the audio signal based on a comparison of the recovered values of the elements of the target region and values of elements of the partitioned target region; and
   perform a control action based on the anomaly score.

2. The audio processing system of claim 1, wherein the at least one processor is configured to:
   partition the spectrogram into different combinations of context regions and target regions to produce a set of context regions and a corresponding set of target regions;

execute the neural network multiple times, once for each context region in the set of context regions to produce a set of recovered target regions;

compare each recovered target region in the set of recovered target regions with the corresponding target region of the set of target regions to determine a set of anomaly scores; and determine the anomaly score based on a pooling operation on the set of anomaly scores.

3. The audio processing system of claim 2, wherein the context region is a first context region, the target region is a first target region, and the anomaly score is a first anomaly score, and wherein the processor is configured to:

identify a second partition of the time-frequency domain based on the first anomaly score;

perform the second partition of the spectrogram into a second context region and a second target region;

repeat the execution of the neural network with values and coordinates of the second context region to recover the second target region and to produce a second anomaly score based on a comparison of the recovered second target region and the partitioned second target region; and perform a second control action based on the second anomaly score, a combination of the first anomaly score and the second anomaly score, or both.

4. The audio processing system of claim 1, wherein the neural network is trained by randomly or pseudo-randomly selecting different partitions of training spectrograms into context and target regions, and wherein during execution of the neural network, the processor is configured to produce multiple partitions of the spectrogram and corresponding anomaly scores according to a predetermined protocol to perform the control action based on a maximum anomaly score.

5. The audio processing system of claim 1, wherein the at least one processor is further configured to:

create a library of anomalous spectrograms based on known anomalous behavior;

identify difficult-to-predict target regions using the library of anomalous spectrograms; and utilize the identified target regions as one or multiple hypotheses to detect the maximum anomaly score.

6. The audio processing system of claim 5, wherein the at least one processor is configured to test the one or multiple hypotheses to determine the target region with the maximum anomaly score, wherein the one or multiple hypotheses include:

a middle frame hypothesis procedure aiming to recover a temporal middle portion of the spectrogram from side portions of the spectrogram sandwiching a middle portion of a frame of the spectrogram from opposite sides of the frame, a frequency masking hypothesis procedure aiming to recover certain frequency regions of the spectrogram from unmasked surrounding regions of the spectrogram, wherein the recovery of the certain frequency regions corresponds to at least reconstructing high frequencies of the spectrogram from low frequencies of the spectrogram, or reconstructing the low frequencies from the high frequencies of the spectrogram;

a frequency masking hypothesis procedure aiming to recover individual frequency band from neighboring and/or harmonically related frequency bands of the spectrogram;

an energy based hypothesis procedure aiming to recover high energy time frequency units of the spectrogram from remaining unmasked time-frequency units of the spectrogram;

a procedure aiming to recover a randomly selected subset of masked frequency bands and time frames from the unmasked remaining regions of the spectrogram;

a likelihood bootstrapping procedure that performs multiple passes with different context regions of the spectrogram determined by first sampling different percentages of time-frequency units as context of the spectrogram and reconstructing entire spectrogram, wherein time-frequency regions of the reconstructed spectrogram with high reconstruction likelihood are determined and reconstructing time-frequency regions with low reconstruction likelihood using the time-frequency regions of the reconstructed spectrogram with the high reconstruction likelihood as context;

an ensembling procedure where multiple of the above hypothesis generation procedures is combined to find the maximum anomaly score.

7. The audio processing system of claim 1, wherein the attentive neural process architecture comprises:

an encoder neural network trained to receive an input set of arbitrary size, the input set corresponds to the values and coordinates of elements of the context region, and the encoder produces an embedding vector for each element of the input set;

a cross attention module trained to compute a unique embedding vector for each element of the target region by attending to the embedding vectors of the elements of the context region at neighboring coordinates; and a decoder neural network that outputs a probability distribution for each element of the target region based on the target region coordinates and the unique embedding vector for that target region element.

8. The audio processing system of claim 7, wherein the encoder neural network uses a self-attention mechanism to jointly encode all elements of the context region.

9. The audio processing system of claim 7, wherein the cross attention module uses a multi-head attention.

10. The audio processing system of claim 7, wherein the decoder neural network outputs at least one of: multiple parameters of a conditionally independent Gaussian distribution and multiple parameters of a conditionally independent mixture of Gaussian distributions.

11. The audio processing system of claim 1, wherein the at least one processor is configured to implement a sliding window on the spectrogram, the sliding window is processed by the neural network using the attentive neural network architecture to determine the anomaly score for detecting the anomalous sound.

12. A computer-implemented method for detecting anomalous sound, comprising:

receiving a spectrogram of an audio signal with elements defined by values in a time-frequency domain, wherein a value of each element of the spectrogram is identified by a coordinate in the time-frequency domain;

partitioning the time-frequency domain of the spectrogram into a context region and a target region;

submitting values of elements of the context region and coordinates of the elements of the context region into a neural network including an attentive neural process architecture to recover values of the spectrogram for elements with coordinates in the target region; and determining an anomaly score for detecting the anomalous sound of the audio signal based on a comparison of the recovered values of the elements of the target region and values of elements of the partitioned target region; and performing a control action based on the anomaly score.

13. The method of claim 12, further comprising:

partitioning the spectrogram into different combinations of context and target regions to produce a set of context regions and a corresponding set of target regions;

executing the neural network multiple times, once for each context region in the set of context regions to produce a set of recovered target regions;

comparing each recovered target region in the set of recovered target regions with the corresponding target region to determine a set of anomaly scores; and determining the anomaly score based on a pooling operation on the set of anomaly scores.

14. The method of claim 13, wherein the context region is a first context region, the target region is a first target region, and the anomaly score is a first anomaly score, and further comprising:

identifying a second partition of the time-frequency domain based on the first anomaly score;

performing the second partition of the spectrogram into a second context region and a second target region;

repeating the execution of the neural network with values and coordinates of the second context region to recover the second target region and to produce a second anomaly score based on a comparison of the recovered second target region and the partitioned second target region; and performing a second control action based on the second anomaly score, a combination of the first anomaly score and the second anomaly score, or both.

15. The method of claim 12, further comprising:

training the neural network by randomly or pseudo-randomly selecting different partitions of training spectrograms into context and target regions;

producing multiple partitions of the spectrogram and corresponding anomaly scores according to a predetermined protocol during execution of the neural network; and performing the control action based on the maximum anomaly score.

16. The method of claim 12, further comprising:

creating a library of anomalous spectrograms based on known anomalous behavior;

identifying difficult-to-predict target regions using the library of anomalous spectrograms; and utilizing the identified target regions as one or multiple hypotheses to detect the maximum anomaly score.

17. The method of claim 16, further comprising testing the one or multiple hypotheses to find the target region with the maximum anomaly score, the one or multiple hypotheses include a middle frame hypothesis procedure aiming to recover a temporal middle portion of the spectrogram from side portions of the spectrogram sandwiching the middle portion from opposite sides, a frequency masking hypothesis procedure aiming to recover certain frequency regions of the spectrogram from unmasked surrounding regions of the spectrogram, wherein the recovery of the certain frequency regions corresponds to at least reconstructing high frequencies of the spectrogram from low frequencies of the spectrogram, or reconstructing the low frequencies from the high frequencies of the spectrogram;

a frequency masking hypothesis procedure aiming to recover individual frequency bands from neighboring and/or harmonically related frequency bands;

an energy based hypothesis procedure aiming to recover high energy time frequency units of the spectrogram from remaining unmasked time-frequency units of the spectrogram;

a procedure aiming to recover a randomly selected subset of masked frequency bands and time frames from the unmasked remaining regions of the spectrogram;

a likelihood bootstrapping procedure that performs multiple passes with different context regions determined by first sampling different percentages of time-frequency units as context and reconstructing the entire spectrogram, then finding only those time-frequency regions of the reconstructed spectrogram with high reconstruction likelihood and using them as context in order to reconstruct time-frequency regions with low reconstruction likelihood; and an ensembling procedure for combining multiple of the above hypothesis generation procedures to find the maximal anomaly score.

18. The method of claim 12, wherein the attentive neural process architecture performs:

receiving, by a trained encoder neural network of the attentive neural process architecture, an input set of arbitrary size, the input set corresponds to the values of elements and the coordinates of elements of the context region, and wherein an embedding vector for each element of the input set is outputted by the encoder neural network;

computing, by a trained cross attention module of the attentive neural process architecture, a unique embedding vector for each element of the target region by attending to the embedding vectors of the elements of the context region at neighboring coordinates; and outputting, by a trained decoder neural network, a probability distribution for each element of the target region based on the target region coordinates and the unique embedding vector for that target region element.

19. The method of claim 18, further comprising encoding, by the encoder neural network, jointly all elements of the context region using a self-attention mechanism.

20. The method of claim 18, further comprising outputting, by the decoder neural network, at least one of: multiple parameters of a conditionally independent Gaussian distribution; and multiple parameters of a conditionally independent mixture of Gaussian distributions.

* * * * *